United States Patent
Buchanan et al.

(10) Patent No.: US 12,556,404 B2
(45) Date of Patent: Feb. 17, 2026

(54) IMPERSONATION DETECTION USING AN AUTHENTICATION ENFORCEMENT ENGINE

(71) Applicant: Bank of America Corporation, Charlotte, NC (US)

(72) Inventors: Aaron Buchanan, Mint Hill, NC (US); James Siekman, Charlotte, NC (US); Jeffrey Felipe, Weddington, NC (US); Robert Timothy Leedy, Jr., Belmont, NC (US); Dana Tishgarten Mackay, Charlotte, NC (US); Heidi L. Magura, Charlotte, NC (US); Michael Thomas Malarkey, Waxhaw, NC (US); Karen McFeeters, York, SC (US); Stephen J. Williams, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 210 days.

(21) Appl. No.: 18/510,270

(22) Filed: Nov. 15, 2023

(65) Prior Publication Data

US 2025/0158830 A1     May 15, 2025

(51) Int. Cl.
*H04L 9/32*     (2006.01)
*H04L 9/40*     (2022.01)

(52) U.S. Cl.
CPC ........ *H04L 9/3247* (2013.01); *H04L 63/0876* (2013.01); *H04L 63/102* (2013.01)

(58) Field of Classification Search
CPC .. H04L 9/3247; H04L 63/0876; H04L 63/102
See application file for complete search history.

(56) References Cited

U.S. PATENT DOCUMENTS

| | | | |
|---|---|---|---|
| 9,032,217 B1 * | 5/2015 | Brandwine | G06F 21/64 713/185 |
| 10,637,872 B2 * | 4/2020 | Solow | H04L 63/107 |
| 11,539,817 B1 | 12/2022 | Perez | |
| 11,657,852 B1 | 5/2023 | Zavesky et al. | |
| 11,733,823 B2 | 8/2023 | Seth et al. | |
| 11,755,701 B2 | 9/2023 | Lesso | |

(Continued)

*Primary Examiner* — Abdulkader M Alriyashi
(74) *Attorney, Agent, or Firm* — Banner & Witcoff, Ltd.

(57) ABSTRACT

Aspects related to impersonation detection using an authentication enforcement engine are provided. An authentication enforcement platform may retrieve electronic signatures and device records. The platform may train an authentication enforcement engine, using the electronic signatures and device records, to generate similarity scores for transmissions. The platform may intercept a transmission. The platform may generate a similarity score for the transmission based on extracted information of the transmission. The platform may identify whether the similarity score satisfies a threshold. If the similarity score satisfies a threshold, the platform may update a device record, update the authentication enforcement engine, and route the transmission. If the similarity score fails to satisfy the threshold score, the platform may identify whether manual review is necessary. In some examples, the platform may initiate security actions responsive to the transmission. The platform may update the authentication enforcement engine based on initiating the security actions.

20 Claims, 12 Drawing Sheets

(56) References Cited

U.S. PATENT DOCUMENTS

| | | | |
|---|---|---|---|
| 11,797,519 B2 | 10/2023 | Bates et al. | |
| 11,798,317 B2 | 10/2023 | Dabija et al. | |
| 11,798,564 B2 | 10/2023 | Wang et al. | |
| 11,805,200 B2 | 10/2023 | Trim et al. | |
| 2015/0039513 A1* | 2/2015 | Adjaoute | G06Q 30/0609 |
| | | | 705/44 |
| 2017/0126834 A1* | 5/2017 | Fransen | H04L 67/303 |
| 2023/0128568 A1 | 4/2023 | Kubota et al. | |
| 2023/0153815 A1 | 5/2023 | Blouet et al. | |
| 2023/0177138 A1 | 6/2023 | Alexander | |
| 2023/0177508 A1 | 6/2023 | Ram | |
| 2023/0247432 A1 | 8/2023 | Alexander | |
| 2023/0260521 A1 | 8/2023 | Slocum et al. | |
| 2023/0306792 A1 | 9/2023 | Vemulapalli et al. | |
| 2023/0308878 A1 | 9/2023 | Koral et al. | |
| 2023/0319088 A1 | 10/2023 | Chesla et al. | |
| 2023/0343342 A1 | 10/2023 | Traynor et al. | |
| 2023/0344639 A1 | 10/2023 | Hojjati | |
| 2023/0360091 A1 | 11/2023 | Dalal | |

* cited by examiner

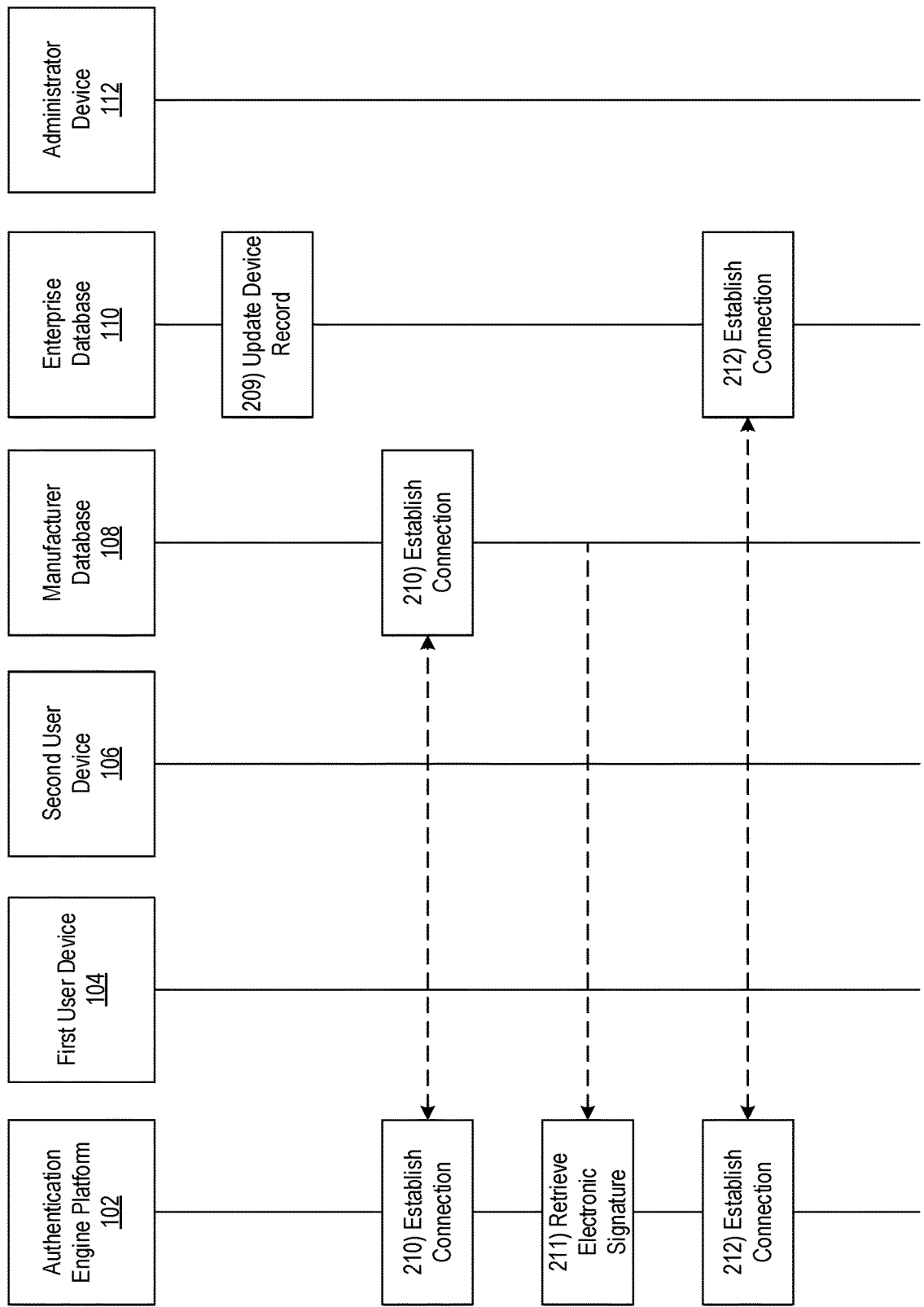

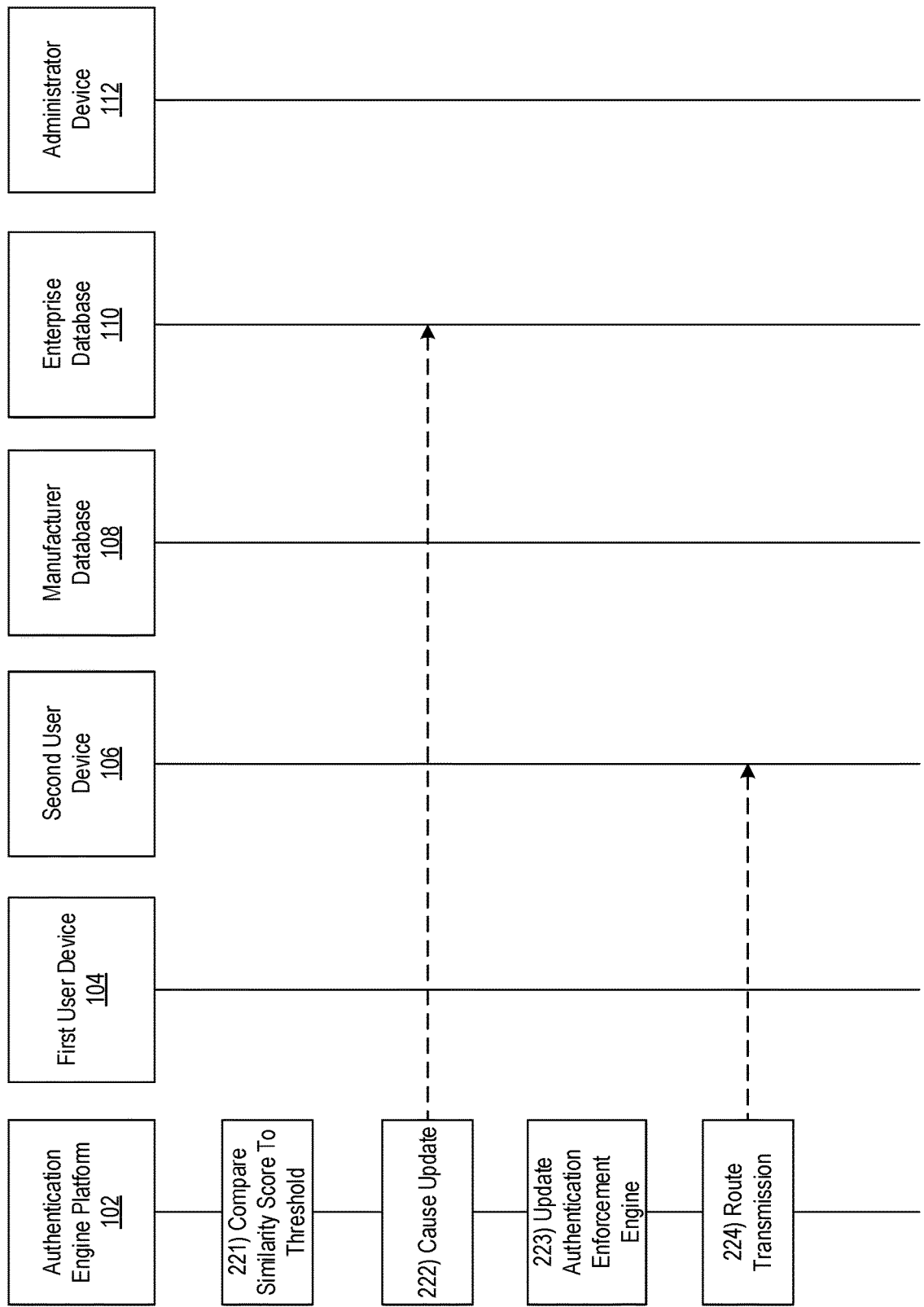

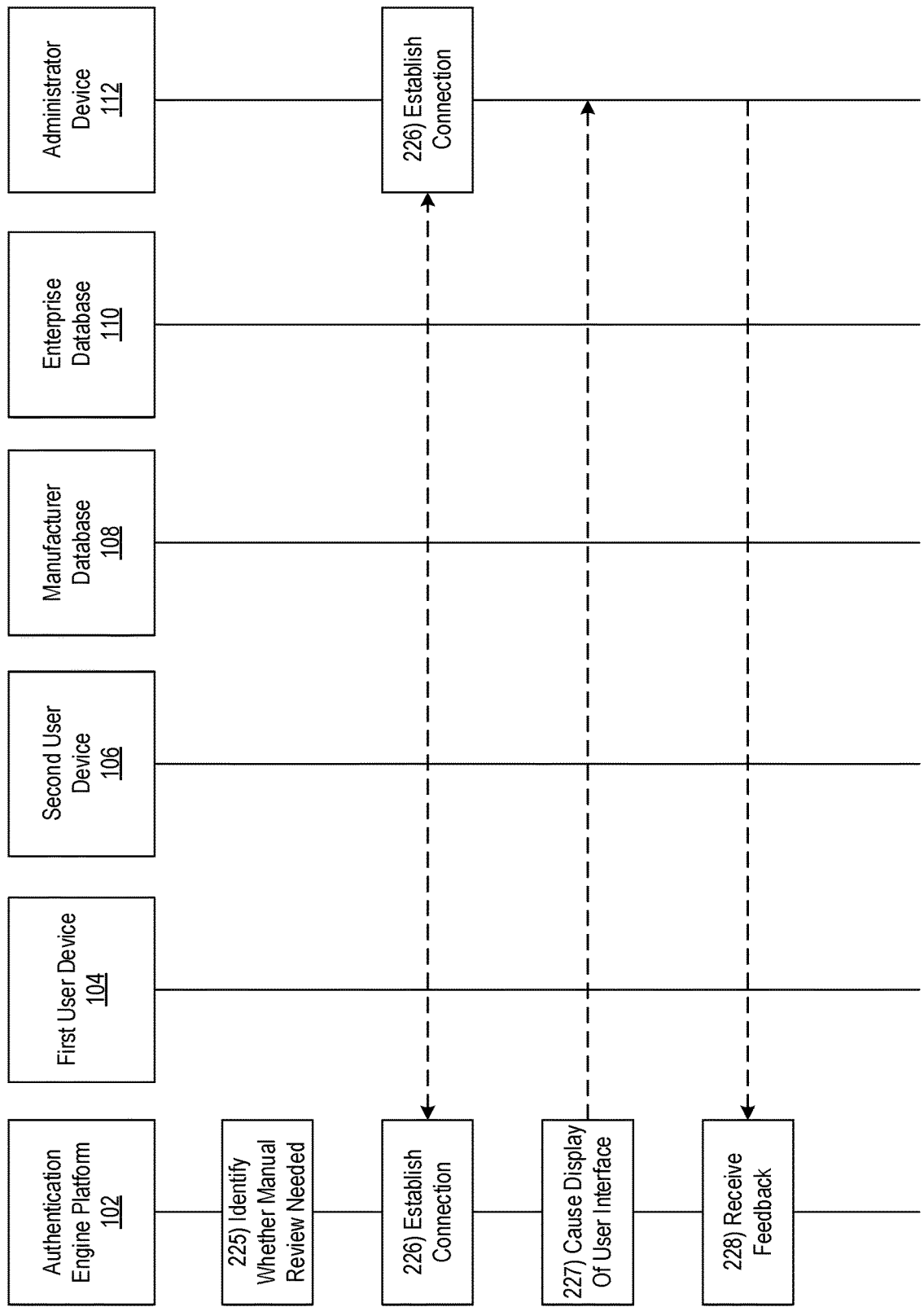

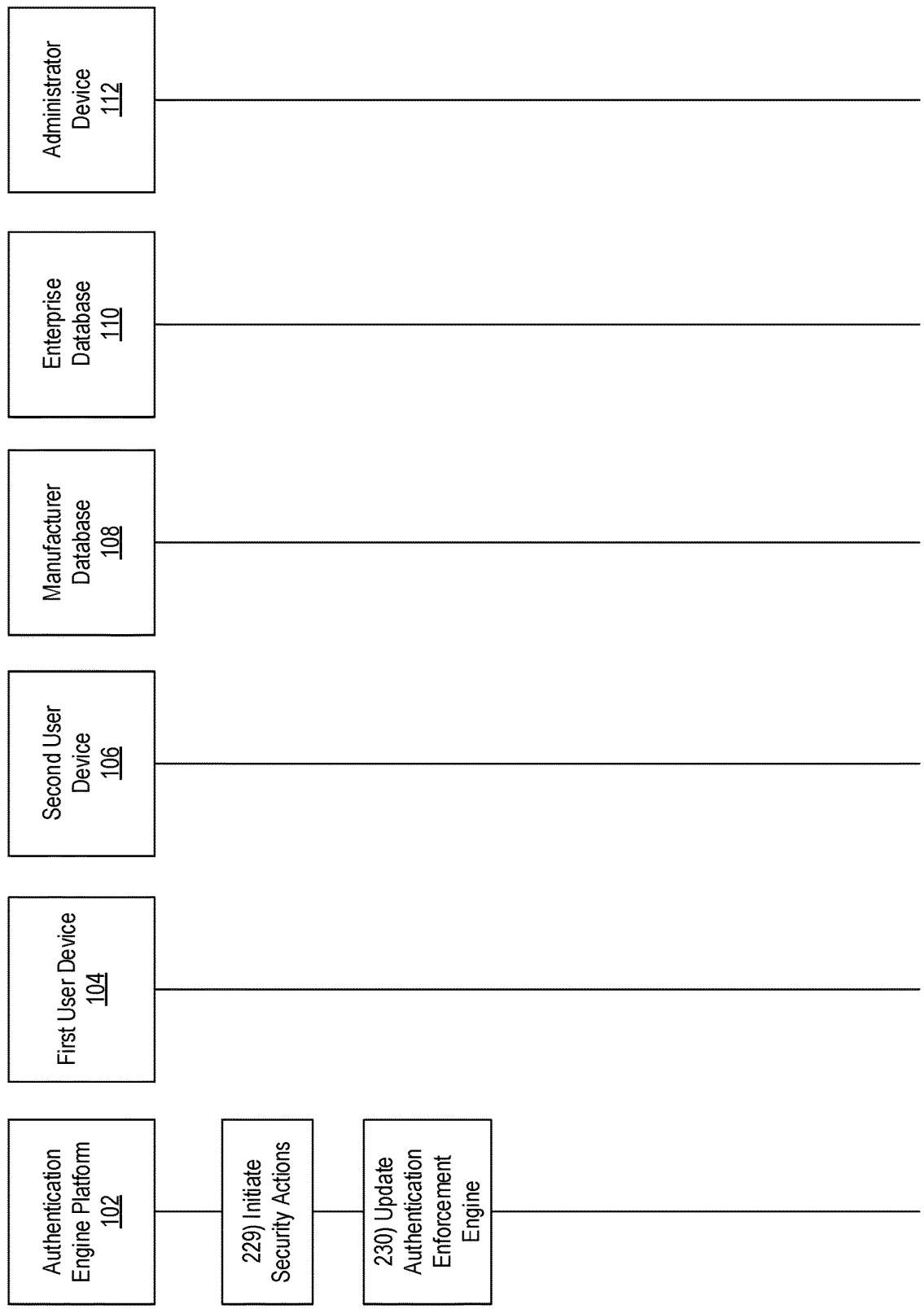

IMPERSONATION DETECTION USING AN AUTHENTICATION ENFORCEMENT ENGINE

BACKGROUND

Aspects described herein are related to impersonation detection using an authentication enforcement engine. In some instances, entities such as an enterprise organization (e.g., a financial institution, and/or other institutions) may maintain a network of associated devices (e.g., user devices, such as laptops, cell phones, and the like, corresponding to employees and/or customers of the enterprise organization). In some instances, malicious actors may attempt to gain unauthorized access to the network by impersonating an authorized user. For example, malicious actors may use synthetic media (e.g., deepfake technology, voice modulators, or the like) to replicate/impersonate the voice of an authorized user (e.g., a customer and/or employee of the enterprise organization). The synthetic media may be used in concert with a device having an electronic signature (e.g., an electronic signature unique to a subscriber identity module ("SIM") card) associated with an authorized user (e.g., a mobile device, laptop, or the like linked to an account of the authorized user, and/or other devices). For example, a malicious actor may use synthetic media to simulate the voice of an authorized user transmitting a message from a device bearing the electronic signature of a device that is associated with the authorized user. Conventional methods of impersonation detection may be unable to detect the use of synthetic media and/or may route the transmitted message to its intended destination based on detecting the electronic signature matches the electronic signature of a device linked to an authorized user. Accordingly, it may be important to provide a means of efficiently and accurately detecting impersonation based on the electronic signature of a device transmitting a message.

SUMMARY

Aspects of the disclosure provide effective, efficient, scalable, and convenient technical solutions that address and overcome the technical problems associated with current methods of detecting impersonations of authorized users on a network. In accordance with one or more arrangements of the disclosure, a computing platform with at least one processor, a communication interface, and memory storing computer-readable instructions may receive an electronic signature corresponding to a first user device. The computing platform may receive the electronic signature from a first database. The computing platform may receive a device record corresponding to the first user device. The computing platform may receive the device record from a second database. The computing platform may generate, based on the electronic signature and the device record, a profile for the first user device. The computing platform may intercept a transmission from the first user device to a second user device of the plurality of user devices. The computing platform may intercept the transmission by monitoring network communications for a plurality of user devices. The computing platform may extract information of the transmission from the intercepted transmission. The information of the transmission may correspond to the first user device. The computing platform may generate, based on inputting the information of the transmission into an authentication enforcement engine, a similarity score for the first user device. The similarity score may indicate a similarity between the information of the transmission and the profile for the first user device. The computing platform may identify whether the similarity score satisfies a threshold score by comparing the similarity score to a threshold score. The computing platform may initiate one or more security actions based on identifying that the similarity score fails to satisfy the threshold score.

In one or more examples, the computing platform may train, prior to generating the similarity score, based on one or more electronic signatures corresponding to one or more user devices, and based on one or more device records corresponding to the one or more user devices, the authentication enforcement engine. Training the authentication enforcement engine may configure the authentication enforcement engine to generate similarity scores for transmissions based on input of information of the transmissions. The computing platform may update the authentication enforcement engine based on identifying whether the similarity score satisfies the threshold score.

In one or more arrangements, the computing platform may identify whether the intercepted transmission is associated with activation of a microphone of the first user device based on the information of the transmission. The computing platform may output an indication that the intercepted transmission originated from a source other than an expected source. The computing platform may output the indication based on identifying that the intercepted transmission is not associated with activation of the microphone of the first user device.

In one or more examples, the information of the transmission may comprise the electronic signature of the first user device. The electronic signature may comprise amplitude modulation information, frequency modulation information, and/or phase modulation information. In one or more arrangements, the second database may be unaffiliated with the first database. In one or more examples, the computing platform may generate the similarity score by comparing, using the authentication enforcement engine, the information of the transmission to the profile for the first user device. In one or more arrangements, the computing platform may compare, based on identifying that the similarity score fails to satisfy the threshold score, the similarity score to a second threshold score. The computing platform may identify, based on comparing the similarity score to the second threshold score, whether the similarity score satisfies the second threshold score. The computing platform may cause, based on determining that the similarity score satisfies the second threshold score, the intercepted transmission to be routed to a third user device. Causing the intercepted transmission to be routed to the third user device may cause display of a user interface at the third user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for impersonation detection using an authentication enforcement engine in accordance with one or more example arrangements;

DETAILED DESCRIPTION

Figure 1A:
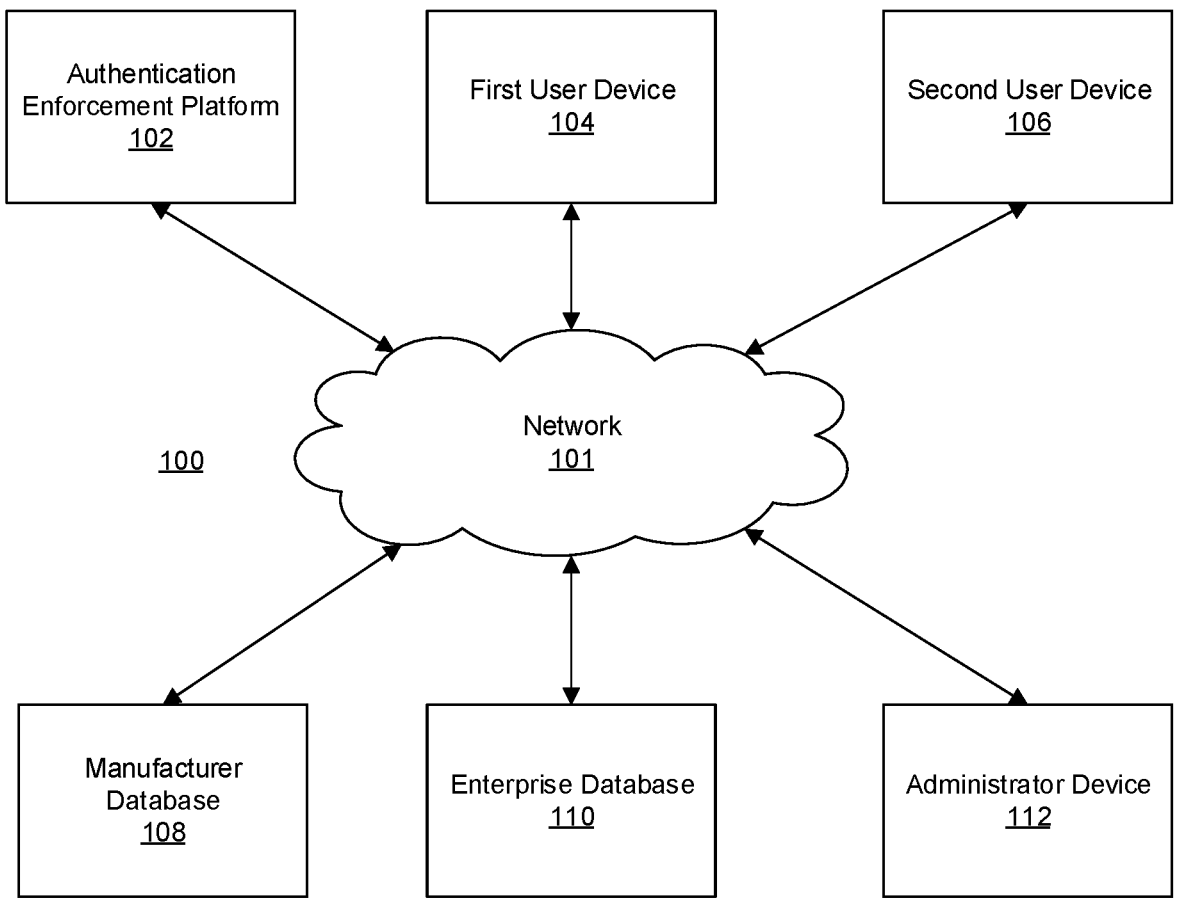
FIGS. 1A-1B depict an illustrative computing environment for impersonation detection using an authentication enforcement engine in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to impersonation detection using an authentication enforcement engine. In some instances, entities such as an enterprise organization (e.g., a financial institution, and/or other institutions) may maintain a network of associated devices (e.g., user devices, such as laptops, cell phones, and the like, corresponding to employees and/or customers of the enterprise organization). In some instances, malicious actors may attempt to gain unauthorized access to the network by impersonating an authorized user. For example, malicious actors may use synthetic media (e.g., deepfake technology, voice modulators, or the like) to replicate/impersonate the voice of an authorized user (e.g., a customer and/or employee of the enterprise organization). The synthetic media may be used in concert with an electronic signature (e.g., an electronic signature associated with a particular SIM card) to circumvent conventional impersonation detection techniques and cause transmissions using the synthetic media to reach devices connected to the network of the enterprise organization. Thus, there exists a need for providing a means by which transmissions impersonating an authorized user may be detected based on the electronic signatures associated with the transmissions.

Accordingly, in some instances, entities such as an enterprise organization and/or other organizations/institutions may employ an authentication enforcement platform, as described herein. An authentication enforcement platform may generate a profile for devices registered with the enterprise organization. For example, the authentication enforcement platform may generate a profile for each device (e.g., mobile phones, laptops, computers, tablets and/or other devices associated with employees and/or customers of the enterprise organization) registered with the enterprise organization, where a profile comprises the electronic signature of a particular device and a device record of other information that may be used to detect impersonations. The authentication enforcement platform may intercept transmissions from devices (that may or may not be associated with the enterprise organization) directed towards devices associated with the enterprise organization. In some examples, the authentication enforcement platform may extract information from the intercepted transmissions (including the electronic signature of the SIM card associated with the transmission) and compare this information to the profile. Based on the comparison, the authentication enforcement platform may identify a likelihood that the transmission is an impersonation of the voice of an authorized user. If the likelihood satisfies one or more particular thresholds, the authentication enforcement platform may initiate security actions designed to prevent impersonators from gaining access to sensitive information and/or gaining access to the network.

In some examples, in performing the methods of deploying and/or utilizing the authentication enforcement platform as described herein, the authentication enforcement platform may train one or more machine learning models. For example, the authentication enforcement platform may train an authentication enforcement engine based on electronic signatures and device records to generate similarity scores for transmissions, based on input of information of the transmissions. Training the authentication enforcement engine may be and/or include the process of generating the profiles for particular devices. The authentication enforcement platform may use the authentication enforcement engine to generate similarity scores for transmissions based on inputting the information of the transmissions into the engine.

These and various other aspects will be discussed more fully herein.

Figure 1B:
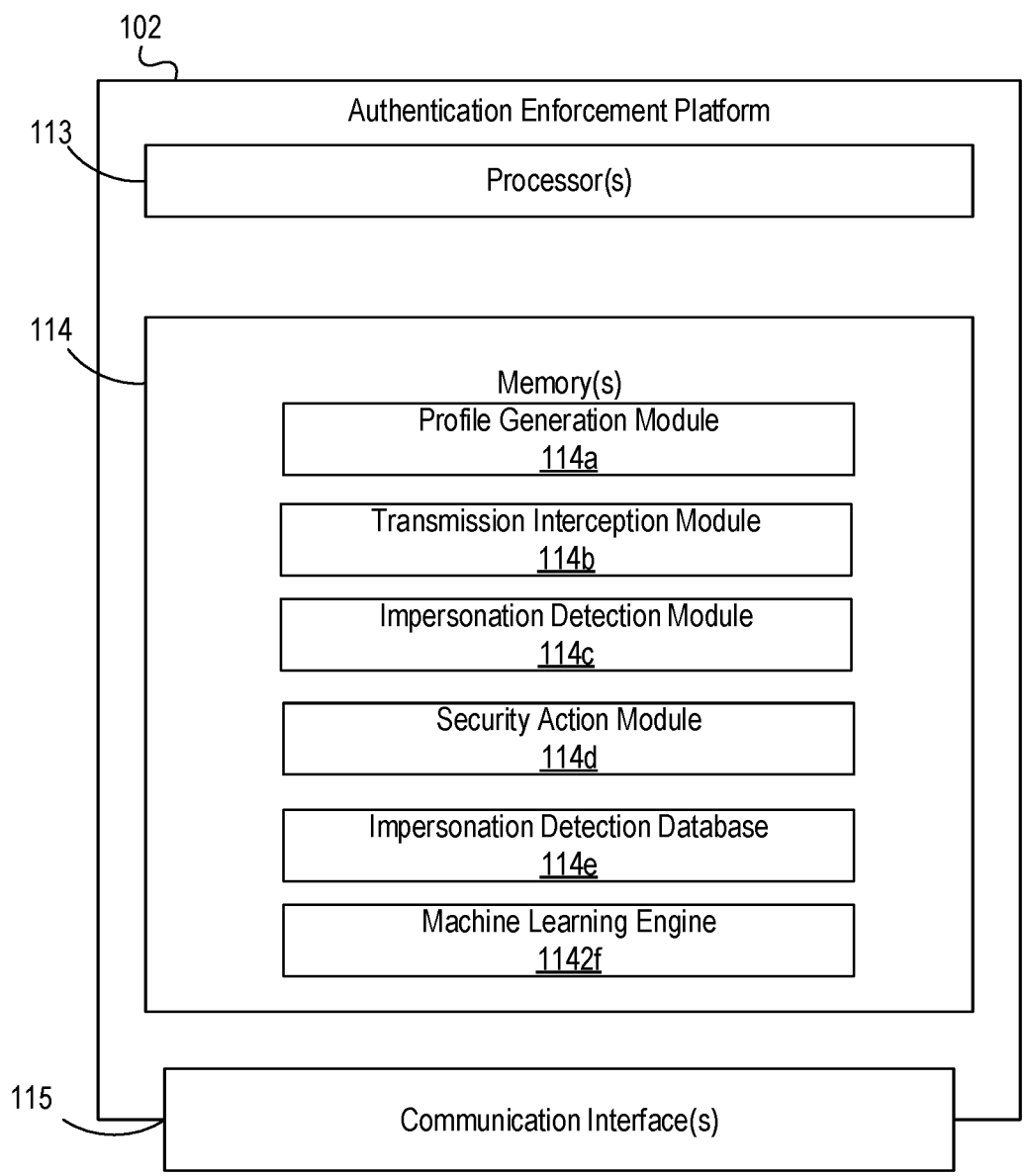

FIGS. 1A-1B depict an illustrative computing environment for impersonation detection using an authentication enforcement engine in accordance with one or more example arrangements. Referring to FIG. 1A, computing environment 100 may include one or more computer systems. For example, computing environment 100 may include an authentication enforcement platform 102, a first user device 104, a second user device 106, a manufacturer database 108, an enterprise database 110, and an administrator device 112.

As described further below, authentication enforcement platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., authentication enforcement, and/or other models). For example, the authentication enforcement platform 102 may train an authentication enforcement engine to generate similarity scores for transmissions (e.g., scores indicating a similarity between the information of the transmission and a profile for a user device) based on input of the information of the transmission. The authentication enforcement platform 102 may be managed by and/or otherwise associated with an enterprise organization (e.g., a financial institution, and/or other institutions) that may, e.g., be associated with one or more additional systems (e.g., first user device 104, second user device 106, manufacturer database 108, enterprise database 110, administrator device 112, and/or other systems). In one or more instances, the authentication enforcement platform 102 may be configured to communicate with one or more systems (e.g., first user device 104, second user device 106, manufacturer database 108, enterprise database 110, administrator device 112, and/or other systems) to perform an information transfer, intercept a transmission, display an interface, initiate a security action, and/or perform other functions.

The first user device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., transmit voice calls, such as voice over internet protocol (VoIP) calls, cellular calls, gateway calls, and/or other methods of transmitting a representation of the voice of a user). The first user device 104 may include a SIM card that corresponds to an entity (e.g., an enterprise organization, such as a financial institution and/or other institution). For example, the SIM card of the first user device 104 may be associated with an employee of the same entity associated with the authentication enforcement platform 102. Alternatively, in some examples, the SIM card of the first user device 104 may be associated with a customer and/or customer account of the entity associated with authentication enforcement platform 102. In one or more instances, the first user device 104 may be configured to communicate with one or more systems (e.g., authentication enforcement platform 102, second user device 106, and/or other systems) as part of transmitting a message, initiating a security action, and/or to perform other functions.

The second user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., receiving transmissions, and/or other functions). For example, the second user device 106 may be a computing device similar to first user device 104. In one or more instances, second user device 106 may correspond to an entity (e.g., an enterprise organization, such as a financial institution and/or other institution). For example, the second user device 106 may correspond to the same entity associated with the authentication enforcement platform 102. In one or more instances, the second user device 106 may be configured to communicate with one or more systems (e.g., authentication enforcement platform 102, and/or other systems) to receive transmissions from other user devices, and/or to perform other functions.

The manufacturer database 108 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information (e.g., a manufactured device database). The manufacturer database 108 may be synchronized across multiple nodes (e.g., sites, institutions, geographical locations, and/or other nodes) and may be accessible by multiple users (who may, e.g., be employees of an enterprise organization such as a financial institutions). The manufacturer database 108 may be associated with an organization (e.g., a device manufacturing organization, or the like). The information stored at the manufacturer database 108 may include information corresponding to devices manufactured by the organization. For example, the manufacturer database 108 may be and/or include a database maintaining electronic records of electronic signatures for devices (e.g., mobile phones, laptops, tablets, or the like). In some instances, the manufacturer database 108 may be accessed by, validated by, and/or modified by any of, authentication enforcement platform 102, first user device 104, and/or other devices. Although shown as part of network 101, it should be understood that manufacturer database 108 may be unaffiliated with the enterprise organization associated with other devices (e.g., authentication enforcement platform 102, first user device 104, second user device 106, enterprise database 110, administrator device 112, or the like). For example, the manufacturer database 108 may be affiliated with an independent device manufacturer (e.g., a mobile phone manufacturer, or the like) and may connect to other devices or systems via a public network (e.g., the internet).

The enterprise database 110 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information (e.g., a device records database). The enterprise database 110 may be synchronized across multiple nodes (e.g., sites, institutions, geographical locations, and/or other nodes) and may be accessible by multiple users (who may, e.g., be employees of an enterprise organization such as a financial institution). The enterprise database 110 may be associated with an organization (e.g., the enterprise organization associated with the authentication enforcement platform 102, or the like). The information stored at the enterprise database 110 may include information corresponding to devices registered with the enterprise organization. For example, the enterprise database 110 may be and/or include a database maintaining electronic device records of electronic signatures for devices (e.g., mobile phones, laptops, tablets, or the like). In some instances, the enterprise database 110 may be accessed by, validated by, and/or modified by any of, authentication enforcement platform 102, first user device 104, and/or other devices. Although shown as an independent database, in some instances, the enterprise database 110 may be part of and/or otherwise integrated into the authentication enforcement platform 102 without departing from the scope of the disclosure.

The administrator device 112 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., displaying an interface, and/or other functions). For example, the administrator device 112 may be a computing device similar to first user device 104 and/or second user device 106. In one or more instances, administrator device 112 may correspond to an entity (e.g., an enterprise organization, such as a financial institution and/or other institution). For example, the administrator device 112 may correspond to the same entity associated with the authentication enforcement platform 102. In one or more examples, the administrator device 112 may be associated with an administrator account/profile of the enterprise organization and may, for example, be configured to cause the authentication enforcement platform 102 to initiate security actions based on detecting impersonations. In one or more instances, the administrator device 112 may be configured to communicate with one or more systems (e.g., authentication enforcement platform 102, and/or other systems) to receive transmissions from other user devices, provide user feedback, and/or to perform other functions. In some instances, the administrator device 112 may be configured to display one or more graphical user interfaces (e.g., impersonation review interfaces, and/or other interfaces).

Although three user/administrator devices are depicted herein, any number of such devices may be used to implement the methods and arrangements described herein without departing from the scope of the disclosure.

Computing environment 100 also may include one or more networks, which may interconnect authentication enforcement platform 102, first user device 104, second user device 106, manufacturer database 108, enterprise database 110, and administrator device 112. For example, computing environment 100 may include a network 101 (which may interconnect, e.g., authentication enforcement platform 102, first user device 104, second user device 106, manufacturer database 108, enterprise database 110, and administrator device 112).

In one or more arrangements, authentication enforcement platform 102, first user device 104, second user device 106, manufacturer database 108, enterprise database 110, and administrator device 112 may be any type of computing device capable of sending and/or receiving requests and processing the requests accordingly. For example, authentication enforcement platform 102, first user device 104, second user device 106, manufacturer database 108, enterprise database 110, and administrator device 112, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of authentication enforcement platform 102, first user device 104, second user device 106, manufacturer database 108, enterprise database 110, and administrator device 112, may, in some instances, be special-purpose computing devices configured to perform specific functions.

Referring to FIG. 1B, authentication enforcement platform 102 may include one or more processors 113, memory 114, and communication interface 115. A data bus may interconnect processor 113, memory 114, and communication interface 115. Communication interface 115 may be a network interface configured to support communication between authentication enforcement platform 102 and one or more networks (e.g., network 101, or the like). Communication interface 115 may be communicatively coupled to the processor 113. Memory 114 may include one or more program modules having instructions that, when executed by processor 113, cause authentication enforcement platform 102 to perform one or more functions described herein and/or one or more databases (e.g., an impersonation detection database 114e, or the like) that may store and/or otherwise maintain information which may be used by such program modules and/or processor 113. In some instances, the one or more program modules and/or databases may be stored by and/or maintained in different memory units of authentication enforcement platform 102 and/or by different computing devices that may form and/or otherwise make up authentication enforcement platform 102. For example, memory 114 may have, host, store, and/or include a profile generation module 114a, a transmission interception module 114b, an impersonation detection module 114c, a security action module 114d, an impersonation detection database 114e, a machine learning engine 114f, and/or other modules and/or databases.

Profile generation module 114a may have instructions that direct and/or cause authentication enforcement platform 102 to communicate with the network 101, retrieve electronic signatures, retrieve device records, generate a profile associated with an electronic signature, and/or perform other functions. Transmission interception module 114b may have instructions that direct and/or cause authentication enforcement platform 102 to monitor the network 101 for transmitted voice messages, intercept transmitted voice messages, extract information from transmissions, and/or perform other functions. Impersonation detection module 114c may have instructions that direct and/or cause authentication enforcement platform 102 to generate similarity scores for intercepted transmissions based on a corresponding profile, compare similarity scores to threshold scores, cause display of a user interface, and/or perform other functions. Security action module 114d may have instructions that direct and/or cause authentication enforcement platform 102 to initiate one or more security actions configured to prevent unauthorized access to the network 101 and/or devices, such as second user device 106. Impersonation detection database 114e may have instructions causing authentication enforcement platform 102 to store electronic signatures, profiles, parameters for security actions, and/or other information. Machine learning engine 114f may have instructions to train, implement, and/or update one or more machine learning models, such as an authentication enforcement engine, and/or other machine learning models.

Although profile generation module 114a, transmission interception module 114b, impersonation detection module 114c, security action module 114d, impersonation detection database 114e, and machine learning engine 114f are depicted as separate modules herein, the instructions stored by these modules may be stored in any number of modules without departing from the scope of this disclosure.

Figure 2A:
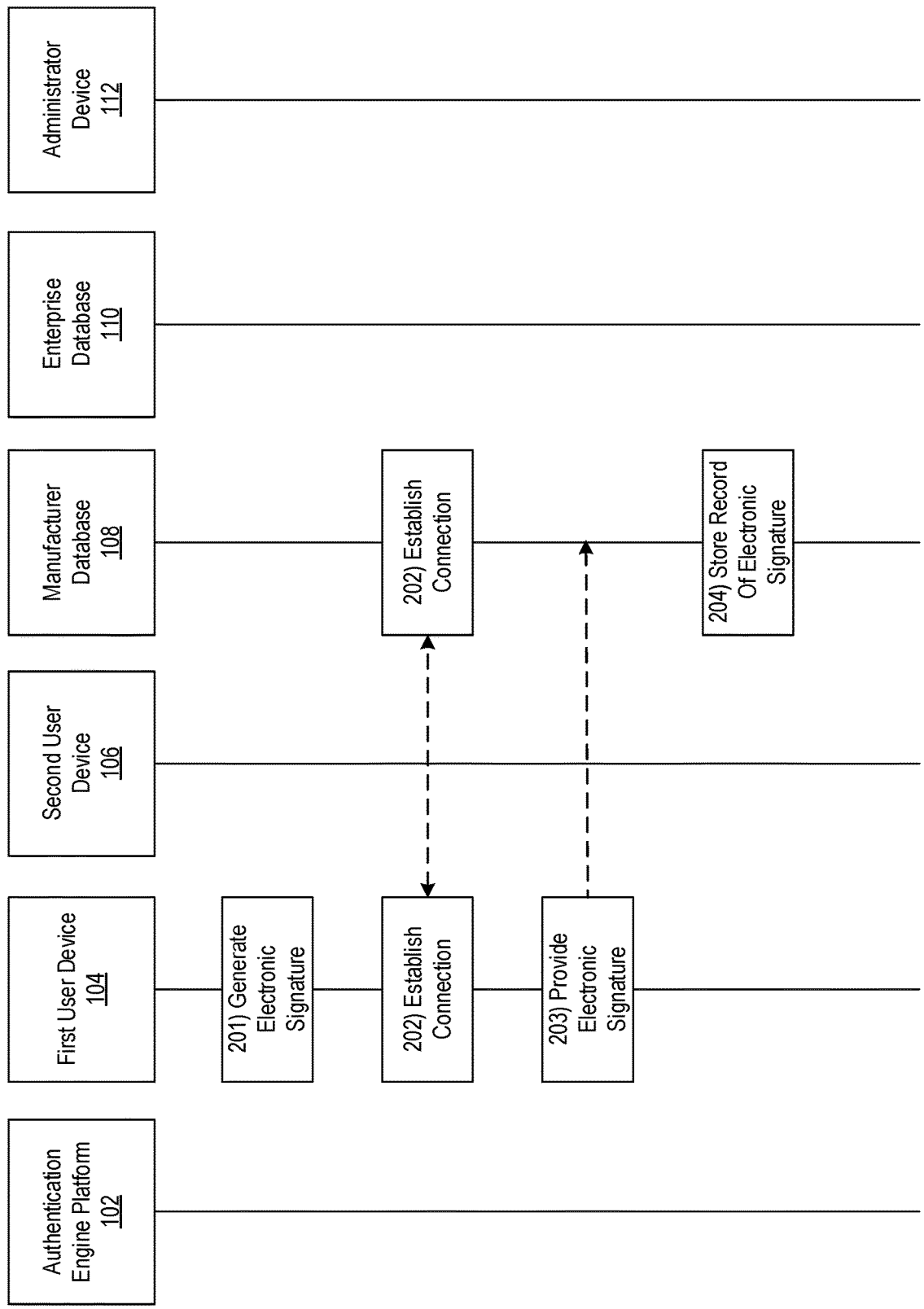

FIGS. 2A-2H depict an illustrative event sequence for impersonation detection using an authentication enforcement engine in accordance with one or more example arrangements. Referring to FIG. 2A, at step 201, an electronic signature may be generated for the first user device 104. The electronic signature may be generated as part of a manufacturing process. For example, while manufacturing the first user device 104, a manufacturer may use and/or generate the electronic signature for a SIM card included in the first user device 104. The electronic signature may be unique to the SIM card of the first user device 104. In some examples, the electronic signature may be and/or include a numerical value. For example, the electronic signature may be a series of binary characters unique to the SIM card and/or the first user device 104. Additionally or alternatively, in some instances, the electronic signature may be and/or include one or more sinusoidal waveforms. For example, the electronic signature may be and/or include sinusoidal waveforms representing: amplitude modulation information, frequency modulation information, and/or phase modulation information unique to electronic signals generated by the SIM card and/or first user device 104.

At step 202, the first user device 104 may establish a connection with the manufacturer database 108. For example, the first user device 104 may establish a first wireless data connection with the manufacturer database 108 to link the manufacturer database 108 with the first user device 104 (e.g., in preparation for providing an electronic signature, completing a manufacturing process, and/or other functions). In some instances, the first user device 104 may identify whether or not a connection is already established with the manufacturer database 108. If a connection is already established with the manufacturer database 108, the first user device 104 might not re-establish the connection. If a connection is not yet established with the manufacturer database 108, the first user device 104 may establish the first wireless data connection as described above. In some examples, the first user device 104 may establish the connection automatically, as part of a configuration process performed during manufacturing. In some instances, the first user device 104 may establish the connection based on a user (e.g., a manufacturer) causing the connection to be established.

At step 203, the first user device 104 may provide the electronic signature to the manufacturer database 108. In some instances, the first user device 104 may provide the electronic signature by transmitting the electronic signature to the manufacturer database 108 via a communication interface of the first user device 104 and while the first wireless data connection is established.

At step 204, based on receiving the electronic signature from the first user device 104, the manufacturer database 108 may store a record of the electronic signature. For example, the manufacturer database 108 may store a file, table, registry, and/or other record associating the electronic signature with the SIM card and/or the first user device 104. It should be understood that the processes described above at steps 201-204 may be performed for one or more additional user devices without departing from the scope of this disclosure. For example, the manufacturer database 108 may store records of the electronic signature for each device manufactured by a particular manufacturer.

Figure 2B:
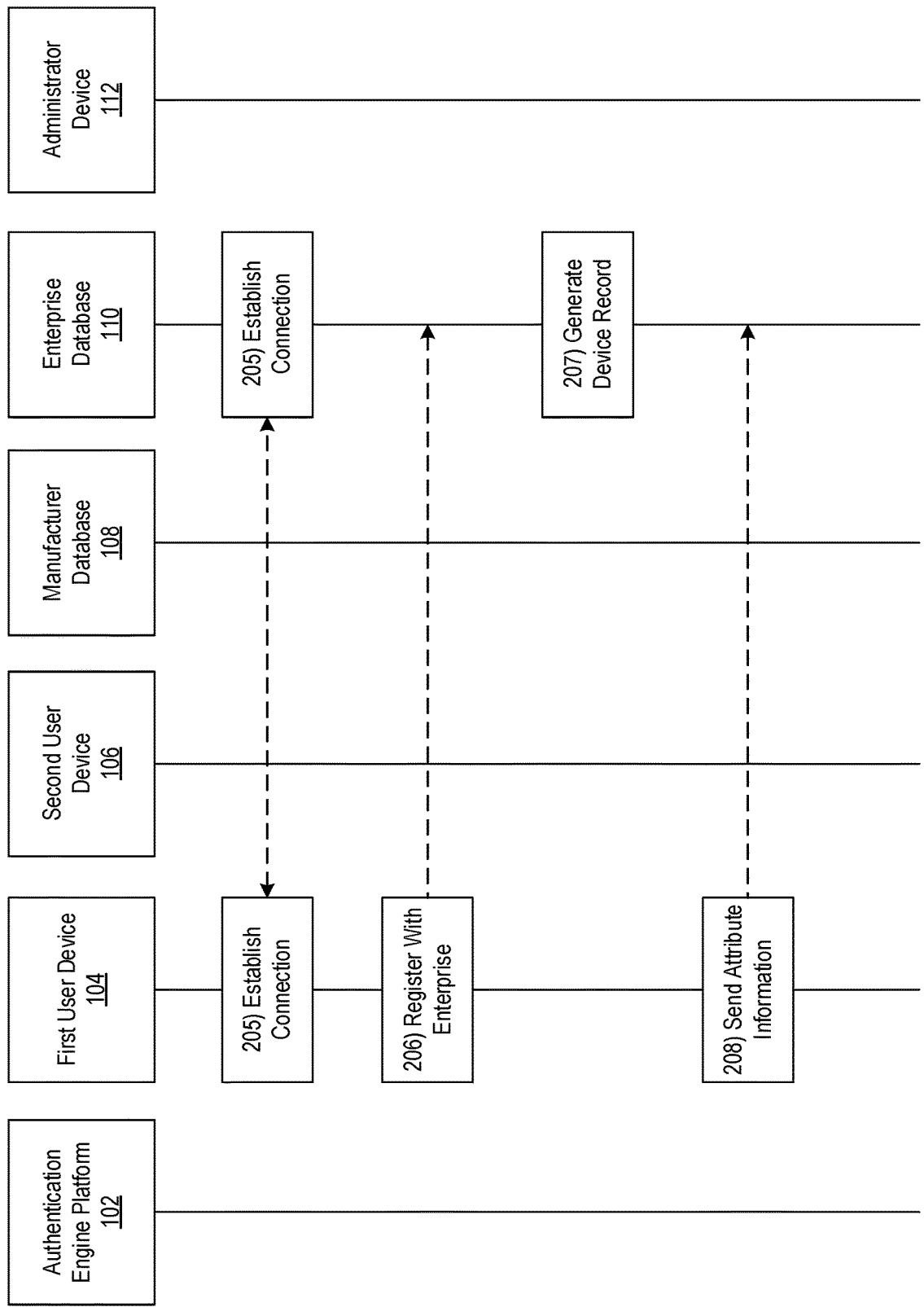

Referring to FIG. 2B, at step 205, the first user device 104 may establish a connection with the enterprise database 110. For example, the first user device 104 may establish a second wireless data connection with the enterprise database 110 to link the enterprise database 110 with the first user device 104 (e.g., as part of a registration process, in preparation for providing attribute information of the first user device 104, and/or other functions). In some instances, the first user device 104 may identify whether or not a connection is already established with the enterprise database 110. If a connection is already established with the enterprise database 110, the first user device 104 might not re-establish the connection. If a connection is not yet established with the enterprise database 110, the first user device 104 may establish the second wireless data connection as described above. The first user device 104 may establish the connection as part of a registration process. For example, an enterprise organization, such as a financial institution and/or other institution, may register the user devices (e.g., cell phones, laptops, tablets, or the like) associated with employees of the enterprise organization and/or the user devices that customers of the enterprise organization link to an account, profile, or the like maintained by the enterprise organization. Accordingly, new user devices may establish a connection such as the second wireless data connection described above when they first register with the network of the enterprise organization (e.g., network 101, or the like).

At step 206, the first user device 104 may register with the enterprise organization associated with the enterprise database 110 referenced in the connection at step 205. For example, the first user device 104 may register with the enterprise organization by providing initial registration information (e.g., an indication of the user, such as an employee and/or customer of the enterprise organization, associated with the first user device 104, a phone number associated with the first user device 104, a serial number of the first user device 104, a device type, such as mobile phone, laptop, tablet, or the like, associated with the first user device 104, and/or other information).

At step 207, based on the first user device 104 registering with the enterprise organization, the enterprise database 110 may generate a device record for the first user device 104. For example, the enterprise database 110 may store, validate, and/or otherwise generate a file, table, registry, and/or other record for the first user device 104. The device record may include the initial registration information provided by the first user device 104 at step 206, and/or other information related to the first user device 104 and/or its user. Additionally or alternatively, the device record may include information previously stored in the enterprise database 110 by the enterprise organization. For example, the device record may include a corporate directory, a watchlist of information associated with malicious actors (e.g., particular phone numbers, geographic locations, internet protocol (IP) addresses, and/or other information), a list of approved technology (e.g., particular device types approved to be connected to the network 101, and/or other approved technology), and/or other information. In some examples, the device record may be and/or include correlations between initial registration information with information previously stored in the enterprise database 110. For example, the device record may comprise an indication that a phone number associated with the first user device 104 matches a watchlist of information associated with malicious actors, and/or other correlations between the initial registration information and the information previously stored in the enterprise database 110.

At step 208, the first user device 104 may send attribute information of the first user device 104 to the enterprise database 110. In some examples, the first user device 104 may send the attribute information as part of a continuous or periodic update process for updating the device record. The first user device 104 may send the attribute information via a communication interface of the first user device 104 and while the second wireless data connection is established. The attribute information may include a variety of information related to the status and/or operating history of the first user device 104. For example, the attribute information may include a manufacturing date of the first user device 104, a frequency of use of the first user device 104 and/or the SIM card of the first user device 104, a change in device and/or device type of the first user device 104 (e.g., if the authorized user of the first user device 104 indicates the SIM card of the first user device 104 was placed in a new device, such as a new mobile phone, the attribute information may include an indication that the SIM card was transferred to a new device), and/or other attribute information.

Referring to FIG. 2C, at step 209, the enterprise database 110 may update the device record. For example, based on receiving the attribute information from the first user device 104 at step 208, the enterprise database 110 may update the device record to include the attribute information by adding, modifying, and/or replacing information in the device record. In updating the device record, the enterprise database 110 may update the device record to include an accurate and up-to-date record of the attributes of the first user device 104.

It should be understood that the functions of steps 208-209 may be repeated continuously or periodically to maintain an accurate and up-to-date record of the first user device 104. For example, the first user device 104 may send attribute information daily, weekly, monthly, and/or at other periods of time while the first user device 104 is associated with the enterprise organization.

At step 210, the authentication enforcement platform 102 may establish a connection with the manufacturer database 108. For example, the authentication enforcement platform 102 may establish a third wireless data connection with the manufacturer database 108 to link the manufacturer database 108 with the authentication enforcement platform 102 (e.g., in preparation for retrieving electronic signatures, and/or other functions). In some instances, the authentication enforcement platform 102 may identify whether or not a connection is already established with the manufacturer database 108. If a connection is already established with the manufacturer database 108, the authentication enforcement platform 102 might not re-establish the connection. If a connection is not yet established with the manufacturer database 108, the authentication enforcement platform 102 may establish the third wireless data connection as described above.

At step 211, based on establishing the connection with the manufacturer database 108, the authentication enforcement platform 102 may retrieve electronic signatures from the manufacturer database 108. For example, the authentication enforcement platform 102 may retrieve the electronic signature of a user device, such as the first user device 104, by accessing the corresponding record of the electronic signature at the manufacturer database 108 and/or by requesting the electronic signature from the manufacturer database 108. The authentication enforcement platform 102 may retrieve the electronic signature via the communication interface 115 and while the third wireless data connection is established.

At step 212, the authentication enforcement platform 102 may establish a connection with the enterprise database 110. For example, the authentication enforcement platform 102 may establish a fourth wireless data connection with the enterprise database 110 to link the enterprise database 110 with the authentication enforcement platform 102 (e.g., in preparation for retrieving device records, and/or other functions). In some instances, the authentication enforcement platform 102 may identify whether or not a connection is already established with the enterprise database 110. If a connection is already established with the enterprise database 110, the authentication enforcement platform 102 might not re-establish the connection. If a connection is not yet established with the enterprise database 110, the authentication enforcement platform 102 may establish the fourth wireless data connection as described above.

Figure 2D:
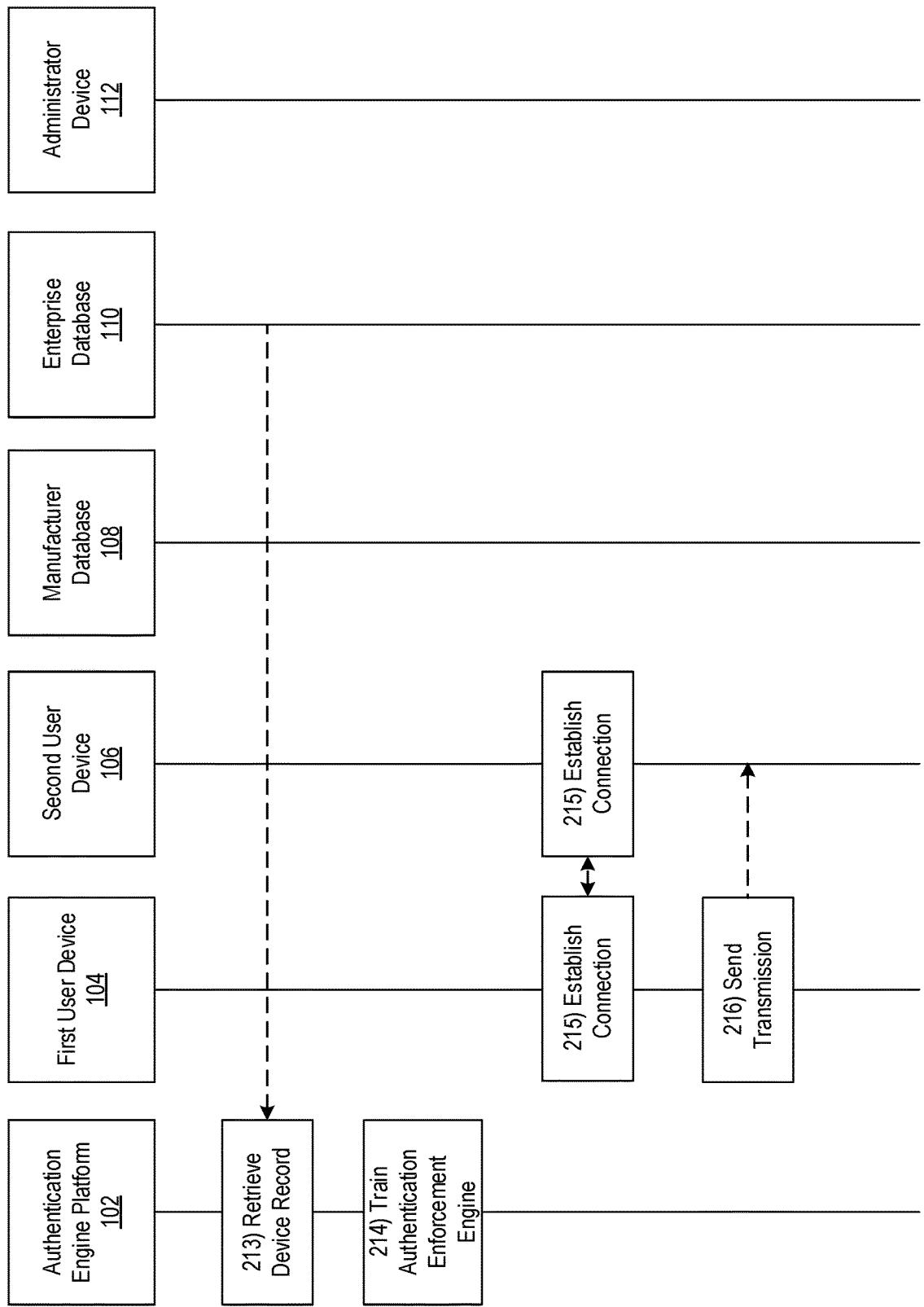

Referring to FIG. 2D, at step 213, the authentication enforcement platform 102 may retrieve a device record from the enterprise database 110. For example, the authentication enforcement platform 102 may retrieve the device record of the first user device 104 by accessing the device record at the enterprise database 110, requesting the device record from the enterprise database 110, and/or otherwise retrieving the device record. The authentication enforcement platform 102 may retrieve the device record via the communication interface 115 and while the fourth wireless data connection is established. It should be noted that step 213 may be repeated continuously or periodically as the device record is updated one or more additional times at steps 208-209.

At step 214, based on retrieving the electronic signature of the first user device 104 and the device record of the first user device 104, the authentication enforcement platform 102 may train an authentication enforcement engine. For example, the authentication enforcement platform 102 may train an authentication enforcement engine to generate similarity scores for transmissions (e.g., transmissions of messages from the first user device 104 to other user devices on network 101, and/or other transmissions) based on input of information of the transmissions. In some instances, the authentication enforcement platform 102 may configure and/or otherwise train the authentication enforcement engine based on training data, such as one or more electronic signatures and/or one or more device records. For instance, the authentication enforcement platform 102 may configure and/or otherwise train the authentication enforcement engine based on the electronic signature of the first user device 104 and the device record of the first user device 104. For example, the authentication enforcement platform 102 may train the authentication enforcement engine to utilize the electronic signature and the device record to determine whether information of transmissions matches expected information of transmissions for the first user device 104, as part of generating the similarity score for a transmission from the first user device 104. In some instances, to configure and/or otherwise train the authentication enforcement engine, the authentication enforcement platform 102 may process the electronic signature and corresponding device information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some examples, in configuring and/or otherwise training the authentication enforcement engine, the authentication enforcement platform 102 may cause the authentication enforcement engine to generate a profile for user devices (e.g., the first user device 104, and/or other user devices). For instance, the authentication enforcement platform 102 may cause the authentication enforcement engine to generate a profile linking the electronic signature of the first user device 104 and/or its SIM card to the device record of the first user device 104 retrieved from the enterprise database 110. In generating the profile, the authentication enforcement engine may store one or more correlations between the electronic signature and the information in the device record. For example, the authentication enforcement engine may store a correlation indicating that the electronic signature of the SIM card of the first user device 104 is linked to a particular phone number of the device record. Accordingly, the authentication enforcement platform 102 may configure and/or otherwise train the authentication enforcement engine to increase the similarity score for a transmission from the first user device 104 when the information of the transmission indicates the transmission originated from and/or is otherwise associated with the same phone number. Additionally or alternatively, as another example, the authentication enforcement engine may store a correlation between an attribute of the electronic signature (e.g., a frequency modulation, a phase modulation, an amplitude modulation, and/or other attributes) and information of the device profile, such as a device type. Accordingly, the authentication enforcement platform 102 may configure and/or otherwise train the authentication enforcement engine to generate similarity scores indicating a greater degree of similarity for transmissions that come from the device type and possess the attribute of the electronic signature than for transmissions that come from different device types, possess different attributes, or both.

Additionally or alternatively, in some examples, the authentication enforcement platform 102 may configure and/or otherwise train the authentication enforcement engine to generate the similarity scores based on comparing information of transmissions to the profile. For example, the authentication enforcement platform 102 may configure and/or train the authentication enforcement engine to use the stored correlations to identify a similarity between the information of a transmission from the first user device 104 and information that, based on the profile, is expected for a transmission from the first user device 104. It should be noted that the above are merely a few example methods by which the authentication enforcement platform 102 may train the authentication enforcement engine and that the authentication enforcement platform 102 may additionally and/or alternatively configure and/or otherwise train the authentication enforcement engine based on additional parameters and/or training information without departing from the scope of this disclosure.

At step 215, the first user device 104 may establish a connection with the second user device 106. For example, the first user device 104 may establish a fifth wireless data connection with the second user device 106 to link the second user device 106 with the first user device 104 (e.g., in preparation for sending a transmission, and/or other functions). In some instances, the first user device 104 may identify whether or not a connection is already established with the second user device 106. If a connection is already established with the second user device 106, the first user device 104 might not re-establish the connection. If a connection is not yet established with the second user device 106, the first user device 104 may establish the fifth wireless data connection as described above.

At step 216, based on establishing the fifth wireless data connection, the first user device 104 may send a transmission to the second user device 106. For example, the first user device 104 may send a transmission via a communication interface and while the fifth wireless data connection is established. The transmission may be and/or include a message (e.g., a cellular call, a broadcast, a VoIP call, voice memo, and/or other messages) that comprises a digital representation of the voice of the user of the first user device 104. For example, the message may be and/or include a live/current digital representation of the voice of the user of the first user device 104 (e.g., while the user talks). Additionally or alternatively, the message may be and/or include a recording of the voice of a user (e.g., a voice memo, and/or other recordings).

Figure 2E:
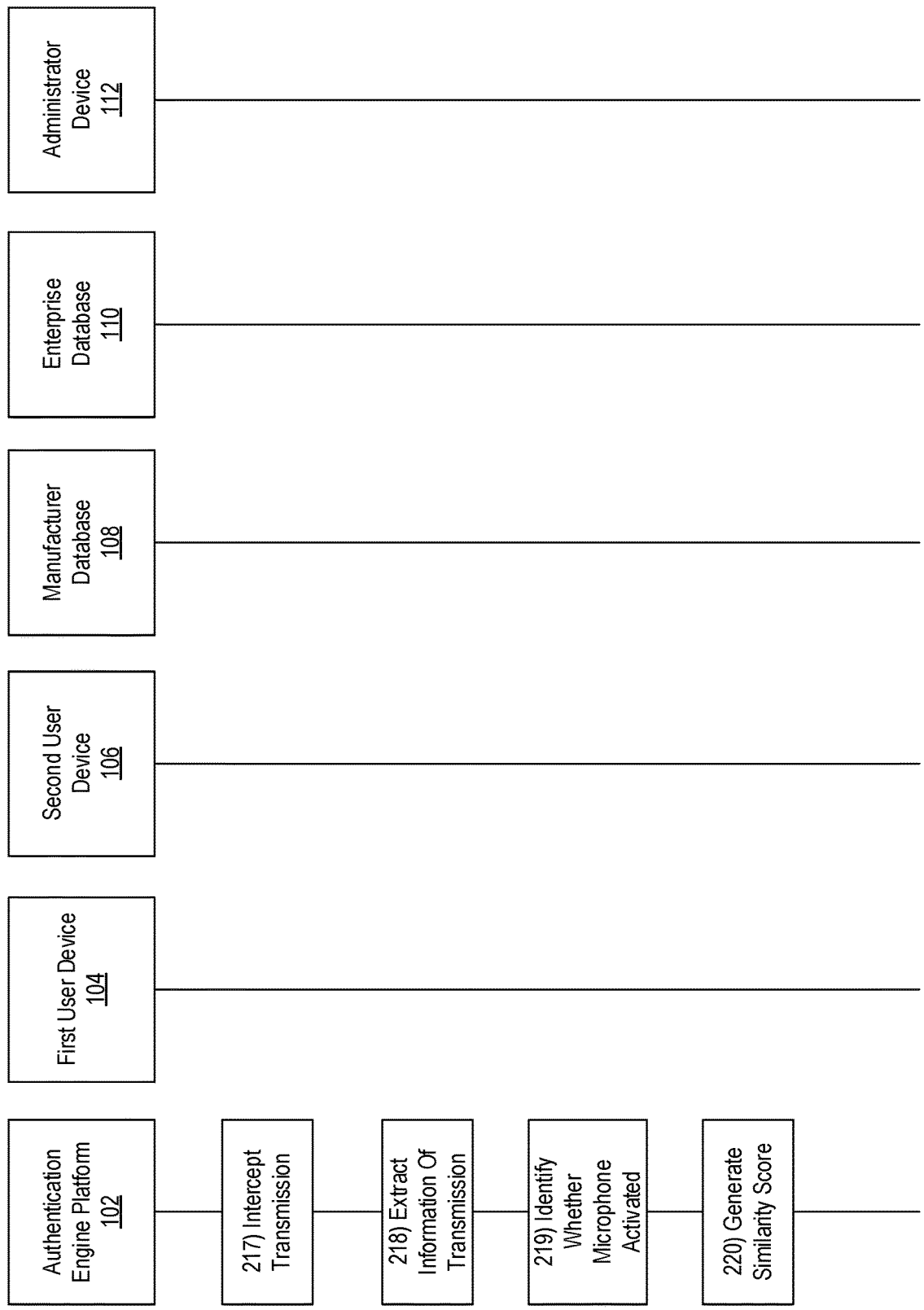

Referring to FIG. 2E, at step 217, the authentication enforcement platform 102 may intercept the transmission from the first user device 104. To intercept the transmission, the authentication enforcement platform 102 may continuously or near-continuously monitor the network 101 for transmissions from a plurality of user devices (including the first user device 104) to other devices on the network 101 (e.g., the second user device 106, and/or other user devices). Based on detecting the initiation of a transmission, the authentication enforcement platform 102 may intercept the transmission by causing the transmission to be routed to the authentication enforcement platform 102 instead of the second user device 106, reroute the transmission from the second user device 106 to the authentication enforcement platform 102 after it has been received by the second user device 106, duplicate the transmission such that it is received by both the authentication enforcement platform 102 and the second user device 106 simultaneously or near-simultaneously, and/or otherwise intercept the transmission. In some instances, based on or as part of intercepting the transmission, the authentication enforcement platform 102 may mask the interception. For example, the authentication enforcement platform 102 may send one or more transmissions to the first user device 104 indicating that the transmission has been received by the second user device 106 and/or that the first user device 104 is in active communication with the second user device 106. Accordingly, the authentication enforcement platform 102 may continue to receive the transmission from the first user device 104. For example, if the transmission was an active VoIP call between the first user device 104 and the second user device 106, the authentication enforcement platform 102 may intercept the call while indicating to the first user device 104 that the call remains active between the first user device 104 and the second user device 106, causing the user of the first user device 104 to continue the call.

At step 218, based on intercepting the transmission, the authentication enforcement platform 102 may extract information of the transmission. For example, the authentication enforcement platform 102 may parse, mine, analyze, and/or otherwise extract any information of the transmission, corresponding to the first user device 104, that might be used to generate similarity scores. The extracted information of the transmission may be and/or include the electronic signature of the first user device 104 (and/or its SIM card), indications of processes associated with the transmission (e.g., activation of a particular application on the first user device 104 to send the transmission, activation of a microphone during the transmission, and/or other processes), the device type of the first user device 104, a serial number of the first user device 104, a geographic location the transmission originated from, a timestamp of the transmission, and/or other information.

At step 219, based on extracting the information of the transmission, the authentication enforcement platform 102 may identify whether a microphone of the first user device 104 was activated to send the transmission and/or during the transmission. For example, the authentication enforcement platform 102 may analyze, parse, and/or otherwise interpret the information of the transmission to identify whether the transmission involved activation of the microphone of the first user device 104. By identifying whether the microphone of the first user device 104 was activated, the authentication enforcement platform 102 may make an initial determination as to whether the transmission involves impersonation of a voice of an authorized user (i.e., the authorized user of the first user device 104). For example, based on identifying that the microphone of the first user device 104 was not involved in the transmission, the authentication enforcement platform 102 may determine that a deepfake algorithm generated a false digital representation of the voice of an authorized user, and/or other impersonation techniques were used to generate a digital representation of the voice of the authorized user. Based on identifying that the transmission did not involve activation of the microphone of the first user device 104, the authentication enforcement platform 102 may proceed to step 225 and determine whether manual review of the transmission is necessary, without performing the functions of steps 220-224 described below. Based on identifying that the transmission did involve activation of the microphone of the first user device 104, the authentication enforcement platform 102 may proceed to further detect whether impersonation of the voice of the authorized user occurred by progressing to step 220 and generating a similarity score for the transmission.

At step 220, based on identifying that the transmission did involve activation of the microphone of the first user device 104, the authentication enforcement platform 102 may generate a similarity score for the transmission, indicating a similarity between the transmission and expected information of the transmission. In some examples, the authentication enforcement platform 102 may generate the similarity score for the transmission by inputting the information of the transmission into the authentication enforcement engine. In generating the similarity score, based on inputting the information of the transmission into the authentication enforcement engine, the authentication enforcement platform 102 may use a profile of the first user device 104 (and/or its SIM card) which may, e.g., have previously been used to train the authentication enforcement engine. In using the profile, the authentication enforcement platform 102 may cause the authentication enforcement engine to generate the similarity score based on comparing particular features of the information of the transmission to the profile.

For example, the authentication enforcement platform 102 may cause the authentication enforcement engine to use one or more stored correlations to identify a similarity between the information of a transmission from the first user device 104 and information that, based on the profile, is expected for a transmission from the first user device 104. For instance, the authentication enforcement platform 102 may have previously trained the authentication enforcement engine by generating a profile that stores a correlation between the electronic signature, or an attribute of the electronic signature (e.g., a frequency modulation, a phase modulation, an amplitude modulation, and/or other attributes), and information of the device profile, such as a device type. In such an example, the authentication enforcement engine may compare the device type of the first user device 104 included in the information of the transmission and/or the attribute of the electronic signature with the stored correlation in the profile. Accordingly, the authentication enforcement platform 102 may cause the authentication enforcement engine to identify whether the device type indicated by the information of the transmission matches the expected device type (i.e., the device type in the profile) for transmissions associated with the electronic signature. Based on identifying a match between the device type indicated by the information of the transmission and the device type of the profile, the authentication enforcement platform 102 may cause the authentication enforcement engine to increase the similarity score as it is generated. For example, if the similarity score was previously 50% (e.g., based on one or more additional comparisons between the information of the transmission and the profile), the authentication enforcement engine may increase the similarity score to 55%, and/or other values. Based on identifying that there is not a match between the device type indicated by the information of the transmission and the device type of the profile, the authentication enforcement platform 102 may cause the authentication enforcement engine to decrease the similarity score as it is generated. For example, if the similarity score was previously 50% (e.g., based on one or more additional comparisons between the information of the transmission and the profile), the authentication enforcement engine may decrease the similarity score to 45%, and/or other values.

It should be understood that the above merely represents an example of the method by which the similarity score may be generated by comparing information of the transmission and the profile, and that additional information of the transmission may be compared to additional correlations of the profile to generate the similarity score.

For example, the authentication enforcement platform 102 may cause the authentication enforcement engine to generate the similarity score by performing a comprehensive comparison between the information of the transmission and some or all of the information of the profile for the first user device 104 associated with the transmission. In performing the comparison, the authentication enforcement platform 102 may cause the authentication enforcement engine to assign different weights to different features of the information of the transmission. For example, identifying that the device type of the first user device 104 sending the transmission matches the expected device type of the profile may cause an increase of, e.g., 5% in the similarity score while identifying that the phone number associated with the first user device 104 matches the expected phone number of the profile may cause an increase of, e.g., 10% in the similarity score, based on the phone number being weighted twice as important as the device type. The authentication enforcement engine may use one or more machine learning algorithms in performing the comparison. For example, the authentication enforcement platform 102 may have previously trained the authentication enforcement engine to employ a similarity algorithm to generate similarity scores based on the number of features of the information of the transmission that match to corresponding expected features in the device profile. For instance, the authentication enforcement engine may execute the similarity algorithm using the following constraints/parameters:

$$\text{If}\left(\frac{\text{(number of matched features)}}{\text{(total number of compared features)}}\right) \geq 0.5, \text{ then: similarity score} =$$

sum of weights for matched features. If else, then: similarity score = 0.

In this example, the authentication enforcement engine may execute the similarity algorithm to identify whether, based on comparing the information of the transmission to the profile of the first user device 104, the quotient of the number of features of the transmission that match to the expected features of the profile for the first user device 104 divided by the total number of features that were compared (e.g., based on stored correlations in the profile) meets or exceeds 50%. Based on identifying that the quotient meets or exceeds 50%, the authentication enforcement engine may generate a similarity score equal to the sum of the weights assigned to each of the matched features. For instance, if the quotient exceeds 50% and the matched features were the device type, the phone number, and the geographic location associated with the first user device 104, the authentication enforcement engine may generate a similarity score equivalent to the sum of the weights (e.g., 50%, 10%, and 15%, and/or any other weights) for each of the matched features (e.g., resulting in a similarity score of 75% in this example). Else, the authentication enforcement engine may generate a similarity score of 0, indicating that the information of the transmission does not match a sufficient number of features in the profile to receive a similarity score greater than 0. In other examples, the algorithm might not include the comparison of the quotient, and the authentication enforcement platform 102 may simply cause the authentication enforcement engine to generate a similarity score that is equivalent to the sum of the weights for matched features. The weights may be identified based on training date used to train the authentication enforcement engine and/or user input. In some instances, the similarity score generated by the authentication enforcement engine may be an integer value, a decimal value, a percentage, and/or other values. It should be understood that the above example is merely one algorithm the authentication enforcement engine may be trained to employ in order to generate the similarity score and in one or more instances additional or alternative algorithms may be employed and/or may correspond to different parameters.

Referring to FIG. 2F, at step 221, the authentication enforcement platform 102 may compare the similarity score to a threshold score. For example, the authentication enforcement platform 102 may compare the similarity score to a threshold score in order to identify a likelihood that the transmission is attempting to impersonate an authorized user. The threshold score may be a value (e.g., an integer value, a percentage, a decimal value, and/or other values) that, when satisfied, indicates that transmission is likely authentic and is not associated with an attempt to impersonate an authorized user. The threshold score may vary in one or more additional iterations of step 221 (e.g., for additional transmissions received from the first user device 104) based on configuration and/or rule changes. For example, the authentication enforcement platform 102 may receive instructions configuring the authentication enforcement platform 102 to identify transmissions with similarity scores less than 75% as failing to satisfy the threshold score. Based on comparing the similarity score to the threshold score, the authentication enforcement platform 102 may identify whether the similarity score satisfies the threshold score. In some instances, based on determining that the similarity score is less than the threshold score, the authentication enforcement platform 102 may identify that the similarity score fails to satisfy the threshold score. For example, based on comparing a similarity score of 20% to a threshold score of 75%, the authentication enforcement platform 102 may identify that the similarity score does not satisfy the threshold score. In other examples, based on determining that the similarity score meets or exceeds the threshold score, the authentication enforcement platform 102 may identify that the similarity score satisfies the threshold score, indicating a likelihood that the transmission includes an authentic digital representation of the voice of the authorized user (i.e., the authorized user of the first user device 104 and/or its SIM card sent the transmission to the second user device 106). For instance, based on comparing a similarity score of 80% to a threshold score of 75%, the authentication enforcement platform 102 may identify that the similarity score does satisfy the threshold score.

In some instances, based on identifying that the similarity score does not satisfy the threshold score, the authentication enforcement platform 102 may proceed to identify whether manual review of the similarity score is required, and may progress to step 225 without performing the functions described below at steps 222-224. In some examples, based on determining that the similarity score does satisfy the threshold score, the authentication enforcement platform 102 may proceed to update information related to the transmission at step 222.

At step 222, based on identifying that the similarity score does satisfy the threshold score, the authentication enforcement platform 102 may cause an update at the enterprise database 110. For example, the authentication enforcement platform 102 may cause the enterprise database 110 to update the device record for the first user device 104 (and/or its SIM card) to include the extracted information of the transmission. For example, based on transmission information indicating a new device type is associated with the SIM card (e.g., if the SIM card has been moved from the original first user device 104 to a new user device) the authentication enforcement platform 102 may cause the enterprise database 110 to update the device record to designate the new device as the first user device 104. In causing the update at the enterprise database 110, the authentication enforcement platform 102 may send the information of the transmission via the communication interface 115 and while the fourth wireless data connection is established. In some examples, the authentication enforcement platform 102 may additionally send one or more instructions causing the enterprise database 110 to update the device record.

At step 223, the authentication enforcement platform 102 may refine, validate, and/or otherwise update the authentication enforcement engine. For example, the authentication enforcement platform 102 may update the authentication enforcement engine based on the information of the transmission. In some instances, updating the authentication enforcement engine may include inputting the information of the transmission into the authentication enforcement engine. By inputting the information of the transmission into the authentication enforcement engine, the authentication enforcement platform 102 may create an iterative feedback loop that may continuously and dynamically refine the authentication enforcement engine to improve its accuracy. For example, based on inputting the information of the transmission, the authentication enforcement platform 102 may cause the authentication enforcement engine to store and/or update one or more correlations in the profile for the first user device 104 (and/or its SIM card) for future iterations of the feedback loop. For example, based on a transmission being associated with a different phone number than the phone number identified by the profile, the authentication enforcement platform 102 may cause the authentication enforcement engine to store a new correlation in the profile, indicating a correlation between the electronic signature and the new phone number, for use in generating similarity scores in future iterations of the feedback loop.

In updating the authentication enforcement engine, the authentication enforcement platform 102 may improve the accuracy of the profile for determining matches between the profile and information of future transmissions, which may, e.g., result in more efficient training of machine learning models trained by the authentication enforcement platform 102 (and may in some instances, conserve computing and/or processing power/resources in doing so). The authentication enforcement platform 102 may further increase the likelihood of detecting true impersonation attempts and reduce the likelihood of "false positives" by ensuring the profile used to generate similarity scores reflects up-to-date information of the first user device 104 and/or its SIM card.

At step 224, based on identifying that the similarity score does satisfy the threshold score, the authentication enforcement platform 102 may route the transmission to its intended destination. For example, the authentication enforcement platform 102 may route the transmission to the second user device 106. In routing the transmission, the authentication enforcement platform 102 may send, redirect, and/or otherwise route the transmission to the second user device 106 via the communication interface 115. Based on routing the transmission to its intended destination, the authentication enforcement platform 102 may return to step 217 and continue monitoring the network 101 for transmissions to intercept.

Referring to FIG. 2G, at step 225, the authentication enforcement platform 102 may identify whether manual review of the transmission is necessary. For example, the authentication enforcement platform 102 may identify whether manual review of the transmission is necessary based on identifying that the intercepted transmission is not associated with activation of the microphone of the first user device 104. In identifying whether manual review of the transmission is necessary, the authentication enforcement platform 102 may check one or more configurations and/or rulesets programmed on the authentication enforcement platform 102. For example, based on a configuration and/or ruleset indicating that transmissions not associated with activation of the microphone should automatically be sent for manual review, the authentication enforcement platform 102 may proceed to step 226 to initiate manual review of the transmission.

Additionally or alternatively, the authentication enforcement platform 102 may identify whether manual review of the transmission is necessary based on identifying that the similarity score does not satisfy the threshold score. For example, the authentication enforcement platform 102 may identify whether the similarity score indicates that manual review is necessary to determine whether the transmission is associated with an impersonation attempt, or that no manual review is necessary and the transmission is confirmed to be associated with an impersonation attempt. In identifying whether manual review is necessary, the authentication enforcement platform 102 may compare the similarity score to a second threshold score. The second threshold score may be lower than the first threshold score. For example, the first threshold score (of step 221) may be 75%, and the second threshold score may be 50%. Accordingly, based on comparing a similarity score of 55% to the second threshold score, the authentication enforcement platform 102 may identify that the similarity score satisfies the second threshold score. Based on comparing a similarity score of 45% to the second threshold score, the authentication enforcement platform 102 may identify that the similarity score does not satisfy the second threshold score.

Based on identifying that the similarity score satisfies the second threshold score, the authentication enforcement platform 102 may identify that manual review is necessary to identify whether the transmission is associated with an impersonation attempt. Accordingly, the authentication enforcement platform 102 may proceed to step 226 to initiate manual review. Based on identifying that the similarity score does not satisfy the second threshold score, the authentication enforcement platform 102 may identify that manual review is unnecessary to identify whether the transmission is associated with an impersonation attempt. Accordingly, the authentication enforcement platform 102 may proceed to step 229 and initiate one or more security actions.

At step 226, based on identifying that manual review of the transmission is necessary, the authentication enforcement platform 102 may establish a connection with the administrator device 112. For example, the authentication enforcement platform 102 may establish a sixth wireless data connection with the administrator device 112 to link the administrator device 112 with the authentication enforcement platform 102 (e.g., in preparation for routing a transmission, causing display of a user interface, and/or other functions). In some instances, the authentication enforcement platform 102 may identify whether or not a connection is already established with the administrator device 112. If a connection is already established with the administrator device 112, the authentication enforcement platform 102 might not re-establish the connection. If a connection is not yet established with the administrator device 112, the authentication enforcement platform 102 may establish the sixth wireless data connection as described above.

Figure 3:
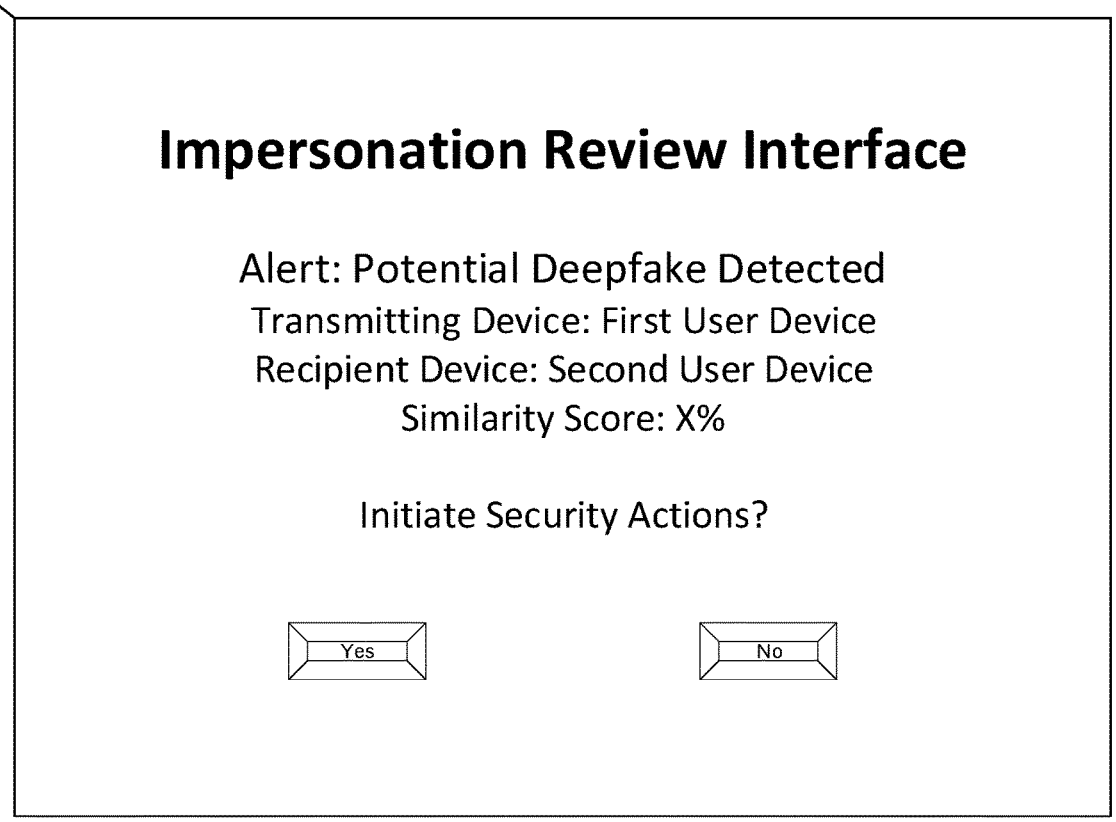
FIG. 3 depicts an illustrative graphical user interface depicting an impersonation review interface generated as part of impersonation detection using an authentication enforcement engine in accordance with one or more example arrangements.

At step 227, the authentication enforcement platform 102 may cause display of a user interface at the administrator device 112. For example, in causing display of the user interface, the authentication enforcement platform 102 may transmit and cause display of an impersonation review interface for performing manual review of a transmission to detect impersonations. In displaying the impersonation review interface, the authentication enforcement platform 102 may cause display of a graphical user interface similar to impersonation review interface 300, which is illustrated in FIG. 3. For example, the authentication enforcement platform 102 may output one or more instructions (via the communication interface 115 and while the sixth wireless data connection is established) to the administrator device 112, an indication that the transmission originated from a source other than an expected source (e.g., based on the similarity score or based on identifying that the transmission is not associated with activation of the microphone), and/or the transmission itself, causing the administrator device 112 to display the impersonation review interface 300.

Referring to FIG. 3, in some instances, the impersonation review interface 300 may include information corresponding to the transmission. For example, the impersonation review interface 300 may include information such as a notification that a potential impersonation technique has been detected, an indication of a suspected impersonation technique (e.g., deepfake, or the like), an indication of the device (e.g., first user device 104) associated with sending the transmission, an indication of the device (e.g., second user device 106) intended to receive the transmission, the similarity score for the transmission, and/or other information. The impersonation review interface 300 may also display interface elements or selectable options requesting user input. For example, the impersonation review interface 300 may display one or more of: an information entry field, a button or buttons, toggle or toggles, check box or boxes, and/or other interface elements. For example, as illustrated in FIG. 3, the interface elements may be one or more buttons the user might toggle to initiate a security action. In some instances, based on user input/feedback initiating a security action (e.g., based on manual review, by a supervisor and/or other individual, of the transmission), the authentication enforcement platform 102 may receive the user input/feedback at step 228 and initiate the one or more security actions at step 229.

Referring back to FIG. 2G, at step 228, the authentication enforcement platform 102 may receive user feedback from the administrator device 112. For example, the authentication enforcement platform 102 may receive the user feedback from the administrator device 112 via the communication interface 115 and while the sixth wireless data connection is established. The user feedback may be and/or include user input indicating whether a security action should be initiated. Based on receiving feedback indicating that a security action should be initiated, the authentication enforcement platform 102 may proceed to step 229 and initiate one or more security actions. Based on receiving feedback indicating that a security action should not be initiated, the authentication enforcement platform 102 may proceed to step 230 without performing the functions of step 229.

Referring to FIG. 2H, at step 229, the authentication enforcement platform 102 may initiate one or more security actions. For example, the authentication enforcement platform 102 may initiate one or more security actions for preventing and/or responding to detected impersonations of authorized users. In some examples, the authentication enforcement platform 102 may initiate the one or more security actions based on receiving user feedback (e.g., as part of a manual review of the transmission). In some instances, the authentication enforcement platform 102 may automatically initiate the one or more security actions based on determining that the similarity score for the transmission fails to satisfy the second threshold score, indicating a likelihood that the transmission is an attempt to impersonate an authorized user.

The security actions may be and/or include updating a watchlist of user devices and/or electronic signatures, blocking a device from accessing the network 101, routing a transmission to a different destination, outputting an alert indicating an impersonation attempt was detected, and/or other security actions. For example, the authentication enforcement platform 102 may update a watchlist of devices and/or electronic signatures known to have previously been involved in impersonation attempts to include the first user device 104 and/or its SIM card. Based on updating the watchlist, the authentication enforcement platform 102 may cause additional cybersecurity programs to use the watchlist to request additional authentication for transmissions coming from the first user device 104 and/or its SIM card. Additionally or alternatively, in some examples, the authentication enforcement platform 102 may route the transmission to a different destination. For example, instead of routing the transmission to the second user device 106, the authentication enforcement platform 102 may route the transmission to a fake phone number, IP address, or the like to confuse an impersonator. Additionally or alternatively, in some instances, the authentication enforcement platform 102 may prevent the first user device 104 from accessing the network 101. For example, the authentication enforcement platform 102 may activate a packet filtering rule blocking transmissions from the first user device 104, disconnect the first user device 104 from the network, remove the first user device 104 from a list of registered devices, and/or otherwise block access of the first user device 104 to the network 101. It should be understood that the above are merely a few examples of the security actions that may be initiated by the authentication enforcement platform 102 and that the authentication enforcement platform 102 may initiate one or more additional or alternative security actions configured to respond to detecting an impersonation attempt without departing from the scope of this disclosure.

At step 230, the authentication enforcement platform 102 may refine, validate, and/or otherwise update the authentication enforcement engine. For example, the authentication enforcement platform 102 may update the authentication enforcement engine based on the information of the transmission and the similarity score. In some instances, updating the authentication enforcement engine may include inputting the information of the transmission and/or the similarity score into the authentication enforcement engine. By inputting the information of the transmission and/or the similarity score into the authentication enforcement engine, the authentication enforcement platform 102 may create an iterative feedback loop that may continuously and dynamically refine the authentication enforcement engine to improve its accuracy. For example, based on inputting the information of the transmission, the authentication enforcement platform 102 may cause the authentication enforcement engine to store and/or update one or more correlations in the profile for the first user device 104 (and/or its SIM card) for future iterations of the feedback loop. For example, based on a transmission being associated with a different phone number than the phone number identified by the profile, the authentication enforcement platform 102 may cause the authentication enforcement engine to store a new correlation in the profile, indicating a correlation between the electronic signature and the new phone number, for use in generating similarity scores in future iterations of the feedback loop. Additionally or alternatively, by inputting the similarity score into the authentication enforcement engine, the authentication enforcement platform 102 may cause the authentication enforcement engine to generate similarity scores for additional transmissions that reflect the inputted similarity score. For example, based on inputting a similarity score that comprises the sum of three weights assigned to features of the transmission, the authentication enforcement platform 102 may cause the authentication enforcement engine to assign the same or similar weights to the same features of additional transmissions when generating similarity scores for the additional transmissions.

In updating the authentication enforcement engine, the authentication enforcement platform 102 may improve the accuracy of the profile for determining matches between the profile and information of future transmissions, which may, e.g., result in more efficient training of machine learning models trained by the authentication enforcement platform 102 (and may in some instances, conserve computing and/or processing power/resources in doing so). The authentication enforcement platform 102 may further increase the likelihood of detecting true impersonation attempts and reduce the likelihood of "false positives" by ensuring the profile used to generate similarity scores reflects up-to-date information of the first user device 104 and/or its SIM card.

Figure 4:
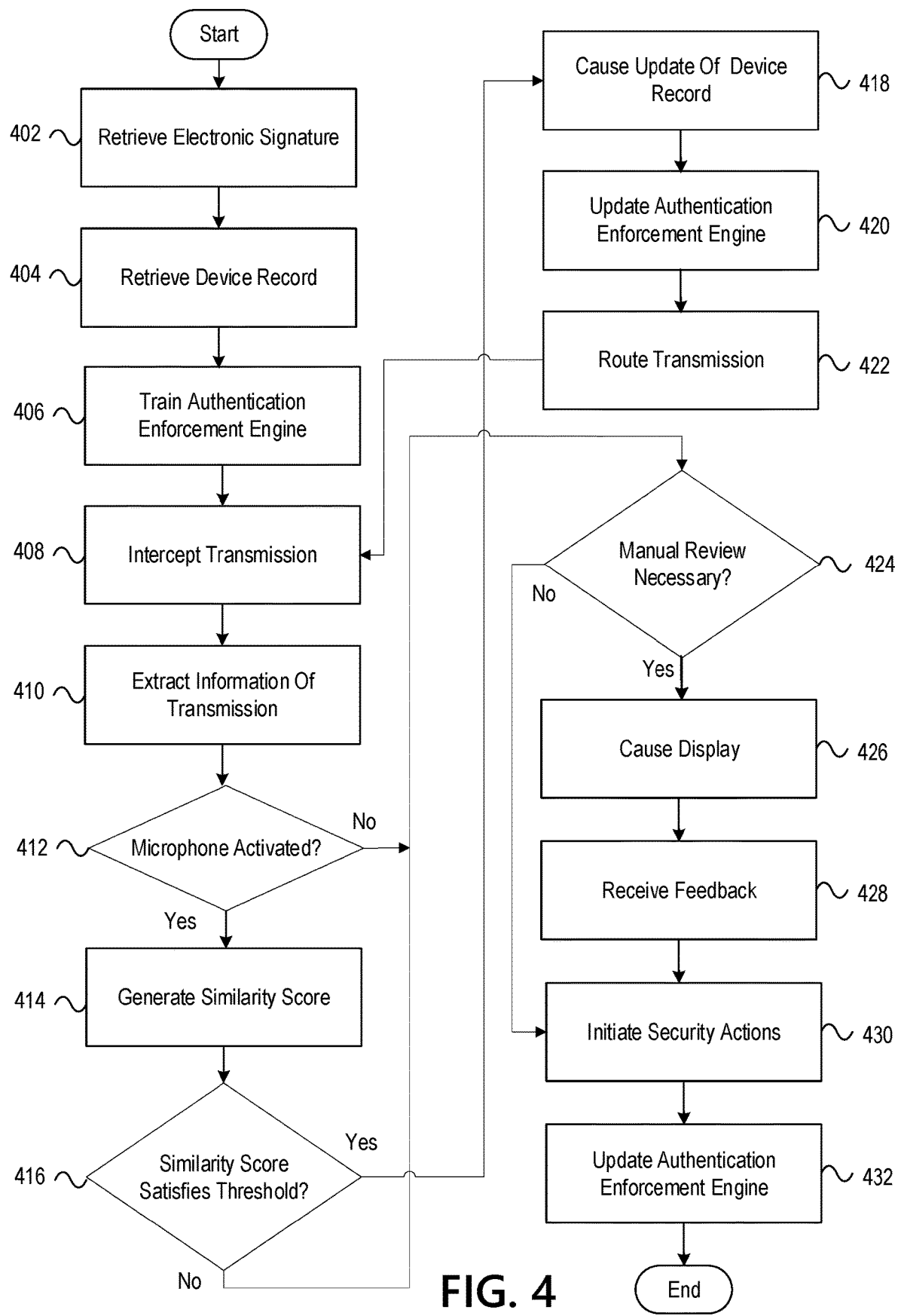
FIG. 4 depicts an illustrative method for impersonation detection using an authentication enforcement engine in accordance with one or more example arrangements.

FIG. 4 depicts an illustrative method for impersonation detection using an authentication enforcement engine in accordance with one or more example arrangements. Referring to FIG. 4, at step 402, a computing platform having at least one processor, a communication interface, and memory may retrieve an electronic signature. For example, the computing platform may retrieve an electronic signature of a device and/or SIM card from a manufacturing database. At step 404, the computing platform may retrieve a device record associated with the electronic signature. At step 406, the computing platform may train an authentication enforcement engine. For example, the computing platform may train an authentication enforcement engine to generate similarity scores for transmissions based on input of information of the transmissions. At step 408, the computing platform may intercept a transmission. For example, the computing platform may intercept a transmission from a device associated with the electronic signature of step 402. At step 410, the computing platform may extract information of the transmission. At step 412, the computing platform may identify whether the transmission involved activation of a microphone. Based on identifying that the transmission did not involve activation of a microphone, the computing platform may proceed to step 424. Based on identifying that the transmission involved activation of a microphone, the computing platform may proceed to step 414.

At step 414, the computing platform may generate a similarity score for the transmission. For example, the computing platform may generate a similarity score for the transmission by inputting the extracted information into the authentication enforcement engine. At step 416, the computing platform may identify whether the similarity score satisfies a threshold score. Based on identifying that the similarity score satisfies the threshold score, the computing platform may proceed to step 418. Based on identifying that the similarity score does not satisfy the threshold score, the computing platform may proceed to step 424. At step 418, based on identifying that the similarity score satisfies the threshold score, the computing platform may cause an update of the device record. At step 420, the computing platform may update the authentication enforcement engine.

For example, the computing platform may update the authentication enforcement engine based on the similarity score and/or the information of the transmission. At step 422, the computing platform may route the transmission to its intended destination. Based on routing the transmission to its intended destination, the computing platform may return to step 408 to intercept one or more additional transmissions.

At step 424, based on identifying that the microphone was not activated or based on identifying that the similarity score does not satisfy the threshold score, the computing platform may identify whether manual review of the transmission is necessary. Based on identifying that manual review is necessary, the computing platform may proceed to step 426. Based on identifying that manual review is not necessary, the computing platform may proceed to step 430. At step 426, based on identifying that manual review is necessary, the computing platform may cause display of a user interface. For example, the computing platform may cause display of a user interface at an administrator device. At step 428, the computing platform may receive feedback from an administrator device. At step 430, based on receiving feedback from the administrator device or based on identifying that manual review is not necessary, the computing platform may initiate one or more security actions. At step 432, the computing platform may update the authentication enforcement engine.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, configure the computing platform to:
   receive, from a first database, an electronic signature corresponding to a first user device;
   receive, from a second database, a device record corresponding to the first user device;
   generate, based on the electronic signature and the device record, a profile for the first user device;
   intercept, by monitoring network communications for a plurality of user devices, a transmission from the first user device to a second user device of the plurality of user devices;
   extract, from the intercepted transmission, information of the transmission, wherein the information of the transmission corresponds to the first user device;
   generate, based on inputting the information of the transmission into an authentication enforcement engine, a similarity score for the first user device, wherein the similarity score indicates a similarity between the information of the transmission and the profile for the first user device;
   identify, by comparing the similarity score to a threshold score, whether the similarity score satisfies the threshold score; and
   initiate, based on identifying that the similarity score fails to satisfy the threshold score, one or more security actions.

2. The computing platform of claim 1, wherein the memory stores additional computer-readable instructions that, when executed by the at least one processor, further configure the computing platform to:
   train, based on one or more electronic signatures corresponding to one or more user devices and one or more device records corresponding to the one or more user devices, the authentication enforcement engine, wherein training the authentication enforcement engine configures the authentication enforcement engine to generate similarity scores for transmissions based on input of information of the transmissions; and
   update, based on identifying whether the similarity score satisfies the threshold score, the authentication enforcement engine.

3. The computing platform of claim 1, wherein the memory stores additional computer-readable instructions that, when executed by the at least one processor, further configure the computing platform to:
   identify, based on the information of the transmission, whether the intercepted transmission is associated with activation of a microphone of the first user device; and
   output, based on identifying that the intercepted transmission is not associated with activation of the microphone of the first user device, an indication that the intercepted transmission originated from a source other than an expected source.

4. The computing platform of claim 1, wherein the information of the transmission comprises the electronic signature of the first user device, the electronic signature comprising:
   amplitude modulation information,
   frequency modulation information, and
   phase modulation information.

5. The computing platform of claim 1, wherein the second database is unaffiliated with the first database.

6. The computing platform of claim 1, wherein the instructions, when executed by the at least one processor, configure the computing platform to generate the similarity score by comparing, using the authentication enforcement engine, the information of the transmission to the profile for the first user device.

7. The computing platform of claim 1, wherein the memory stores additional computer-readable instructions that, when executed by the at least one processor, further configure the computing platform to:
   compare, based on identifying that the similarity score fails to satisfy the threshold score, the similarity score to a second threshold score;
   identify, based on comparing the similarity score to the second threshold score, whether the similarity score satisfies the second threshold score; and
   cause, based on determining that the similarity score satisfies the second threshold score, the intercepted transmission to be routed to a third user device, wherein causing the intercepted transmission to be routed to the third user device causes display of a user interface at the third user device.

8. A method comprising:
   at a computing device comprising at least one processor, a communication interface, and memory:
      receiving, from a first database, an electronic signature corresponding to a first user device;
      receiving, from a second database, a device record corresponding to the first user device;
      generating, based on the electronic signature and the device record, a profile for the first user device;
      intercepting, by monitoring network communications for a plurality of user devices, a transmission from the first user device to a second user device of the plurality of user devices;
      extracting, from the intercepted transmission, information of the transmission, wherein the information of the transmission corresponds to the first user device;
      generating, based on inputting the information of the transmission into an authentication enforcement engine, a similarity score for the first user device, wherein the similarity score indicates a similarity between the information of the transmission and the profile for the first user device;
      identifying, by comparing the similarity score to a threshold score, whether the similarity score satisfies the threshold score; and
      initiating, based on identifying that the similarity score fails to satisfy the threshold score, one or more security actions.

9. The method of claim 8, further comprising:
   training, prior to generating the similarity score, based on one or more electronic signatures corresponding to one or more user devices, and based on one or more device records corresponding to the one or more user devices, the authentication enforcement engine, wherein training the authentication enforcement engine configures the authentication enforcement engine to generate similarity scores for transmissions based on input of information of the transmissions; and
   updating, based on identifying whether the similarity score satisfies the threshold score, the authentication enforcement engine.

10. The method of claim 8, further comprising:
   identifying, based on the information of the transmission, whether the intercepted transmission is associated with activation of a microphone of the first user device; and
   outputting, based on identifying that the intercepted transmission is not associated with activation of the microphone of the first user device, an indication that the intercepted transmission originated from a source other than an expected source.

11. The method of claim 8, wherein the information of the transmission comprises the electronic signature of the first user device, the electronic signature comprising:
   amplitude modulation information,
   frequency modulation information, and
   phase modulation information.

12. The method of claim 8, wherein the second database is unaffiliated with the first database.

13. The method of claim 8, wherein the generating the similarity score comprises comparing, using the authentication enforcement engine, the information of the transmission to the profile for the first user device.

14. The method of claim 8, further comprising:
   comparing, based on identifying that the similarity score fails to satisfy the threshold score, the similarity score to a second threshold score;
   identifying, based on comparing the similarity score to the second threshold score, whether the similarity score satisfies the second threshold score; and
   causing, based on determining that the similarity score satisfies the second threshold score, the intercepted transmission to be routed to a third user device, wherein causing the intercepted transmission to be routed to the third user device causes display of a user interface at the third user device.

15. One or more non-transitory computer-readable media storing instructions that, when executed by a computing platform comprising at least one processor, a communication interface, and memory, cause the computing platform to:
- receive, from a first database, an electronic signature corresponding to a first user device;
- receive, from a second database, a device record corresponding to the first user device;
- generate, based on the electronic signature and the device record, a profile for the first user device;
- intercept, by monitoring network communications for a plurality of user devices, a transmission from the first user device to a second user device of the plurality of user devices;
- extract, from the intercepted transmission, information of the transmission, wherein the information of the transmission corresponds to the first user device;
- generate, based on inputting the information of the transmission into an authentication enforcement engine, a similarity score for the first user device, wherein the similarity score indicates a similarity between the information of the transmission and the profile for the first user device;
- identify, by comparing the similarity score to a threshold score, whether the similarity score satisfies the threshold score; and
- initiate, based on identifying that the similarity score fails to satisfy the threshold score, one or more security actions.

16. The one or more non-transitory computer-readable media of claim 15, storing instructions that, when executed, further cause the computing platform to:
- train, prior to generating the similarity score, based on one or more electronic signatures corresponding to one or more user devices, and based on one or more device records corresponding to the one or more user devices, the authentication enforcement engine, wherein training the authentication enforcement engine configures the authentication enforcement engine to generate similarity scores for transmissions based on input of information of the transmissions; and
- update, based on identifying whether the similarity score satisfies the threshold score, the authentication enforcement engine.

17. The one or more non-transitory computer-readable media of claim 15, storing instructions that, when executed, further cause the computing platform to:
- identify, based on the information of the transmission, whether the intercepted transmission is associated with activation of a microphone of the first user device; and
- output, based on identifying that the intercepted transmission is not associated with activation of the microphone of the first user device, an indication that the intercepted transmission originated from a source other than an expected source.

18. The one or more non-transitory computer-readable media of claim 15, wherein the information of the transmission comprises the electronic signature of the first user device, the electronic signature comprising:
- amplitude modulation information,
- frequency modulation information, and
- phase modulation information.

19. The one or more non-transitory computer-readable media of claim 15, wherein the instructions, when executed, cause the computing platform to generate the similarity score by comparing, using the authentication enforcement engine, the information of the transmission to the profile for the first user device.

20. The one or more non-transitory computer-readable media of claim 15, storing instructions that, when executed, further cause the computing platform to:
- compare, based on identifying that the similarity score fails to satisfy the threshold score, the similarity score to a second threshold score;
- identify, based on comparing the similarity score to the second threshold score, whether the similarity score satisfies the second threshold score; and
- cause, based on determining that the similarity score satisfies the second threshold score, the intercepted transmission to be routed to a third user device, wherein causing the intercepted transmission to be routed to the third user device causes display of a user interface at the third user device.

* * * * *